US008627684B2

(12) United States Patent
Shultz et al.

(10) Patent No.: US 8,627,684 B2
(45) Date of Patent: Jan. 14, 2014

(54) PULL ROLL APPARATUS AND METHOD FOR CONTROLLING GLASS SHEET TENSION

(75) Inventors: Michael George Shultz, Big Flats, NY (US); George Clinton Shay, Moneta, VA (US); David John Ulrich, Burdett, NY (US); James Gary Anderson, Dundee, NY (US); Liam Ruan de Paor, Lexington, KY (US); Lewis Kirk Klingensmith, Corning, NY (US); Patrick Aaron Parks, Elmira, NY (US)

(73) Assignee: Corning Incorporated, Corning, NY (US)

( * ) Notice: Subject to any disclaimer, the term of this patent is extended or adjusted under 35 U.S.C. 154(b) by 536 days.

(21) Appl. No.: 11/978,333

(22) Filed: Oct. 29, 2007

(65) Prior Publication Data

US 2009/0107182 A1 Apr. 30, 2009

(51) Int. Cl.
*C03B 15/02* (2006.01)
(52) U.S. Cl.
USPC .................................................. 65/91; 65/90
(58) Field of Classification Search
USPC ........................................................ 65/91–92
See application file for complete search history.

(56) References Cited

U.S. PATENT DOCUMENTS

| | | | | |
|---|---|---|---|---|
| 1,586,618 A * | 6/1926 | Ferngren | ........................... | 65/85 |
| 3,338,696 A | 8/1967 | Dockerty | ........................ | 65/145 |
| 3,353,943 A * | 11/1967 | Loutte | ........................ | 65/182.4 |
| 3,440,030 A * | 4/1969 | Boaz et al. | ..................... | 65/99.6 |
| 3,520,672 A * | 7/1970 | Greenler et al. | .................. | 65/91 |
| 3,682,609 A | 8/1972 | Dockerty | ........................... | 65/83 |
| 3,695,859 A * | 10/1972 | Dickinson | ...................... | 65/99.5 |
| 3,771,985 A * | 11/1973 | Dickinson | ...................... | 65/99.3 |
| 3,773,486 A | 11/1973 | Toussaint et al. | .................. | 65/29 |
| 3,926,605 A * | 12/1975 | Kunkle | .............. | 65/91 |
| 4,354,866 A * | 10/1982 | Mouly | ......................... | 65/99.5 |
| 4,375,370 A * | 3/1983 | Mouly | ......................... | 65/99.5 |
| 4,612,030 A * | 9/1986 | Smids | .............................. | 65/91 |
| 6,616,025 B1 | 9/2003 | Andrewlavage, Jr. | ....... | 225/96.5 |
| 6,758,064 B1 | 7/2004 | Kariya | .............................. | 65/91 |
| 7,122,242 B2 * | 10/2006 | DiGiampaolo et al. | ...... | 428/156 |
| 2005/0268655 A1 | 12/2005 | Butts et al. | .................... | 65/29.12 |
| 2006/0042314 A1 | 3/2006 | Abbott, III et al. | ............ | 65/25.3 |

FOREIGN PATENT DOCUMENTS

| | | | | |
|---|---|---|---|---|
| JP | 05124826 | 5/1993 | ............. | C03B 17/06 |
| JP | 05124827 | 5/1993 | ............. | C03B 17/06 |
| JP | 10-291826 | 11/1998 | | |
| JP | 2007-051028 | 3/2007 | | |
| TW | 200604116 | 2/2006 | | |

* cited by examiner

*Primary Examiner* — Jodi C Franklin
(74) *Attorney, Agent, or Firm* — Kevin M. Able; Bruce Watson

(57) ABSTRACT

A pull roll apparatus and method are described herein that can control a cross-draw tension and a down-draw tension of a glass sheet while manufacturing the glass sheet. In one embodiment, the pull roll apparatus includes a first driven stub roll pair, a second driven stub roll pair and a control device (e.g., PLC) that controls the first and second driven stub roll pairs while a first edge portion of the glass sheet is drawn between two vertically downtilted rolls associated with the first driven stub roll pair and while an opposing second edge portion of the glass sheet is drawn between two vertically downtilted rolls associated with the second driven stub roll pair. If desired, the pull roll apparatus may include a pulling roll assembly (located below the first and second driven stub rolls) or another set of driven stub roll pairs (located below the first and second driven stub roll pairs).

14 Claims, 15 Drawing Sheets

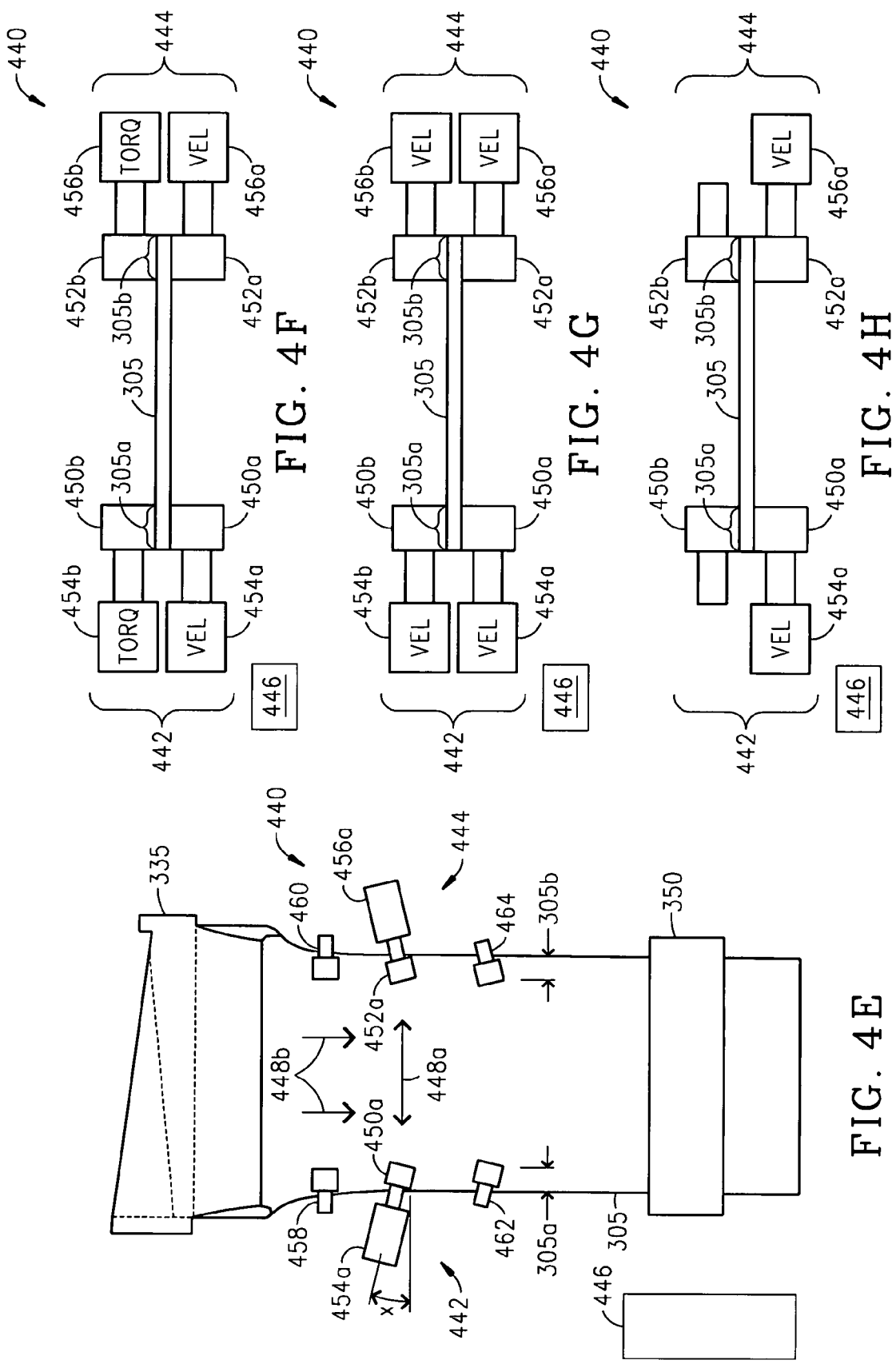

PULL ROLL APPARATUS AND METHOD FOR CONTROLLING GLASS SHEET TENSION

TECHNICAL FIELD

The present invention relates to a pull roll apparatus that can control a cross-draw tension and a down-draw tension of a glass sheet while manufacturing the glass sheet.

BACKGROUND

Corning Inc. has developed a process known as the fusion process (e.g., overflow downdraw process) to form high quality thin glass sheets that can be used in a variety of devices like flat panel displays. The fusion process is the preferred technique for producing glass sheets used in flat panel displays because the fusion process produces glass sheets whose surfaces have superior flatness and smoothness when compared to glass sheets produced by other methods. The fusion process is described in U.S. Pat. Nos. 3,338,696 and 3,682,609, the contents of which are incorporated herein by reference.

Referring to FIG. 1 (PRIOR ART), there is shown a schematic view of an exemplary glass manufacturing system 100 that implements the fusion process and uses a traditional pull roll apparatus 140 to make a glass sheet 105. The glass manufacturing system 100 includes a melting vessel 110, a fining vessel 115, a mixing vessel 120 (e.g., stir chamber 120), a delivery vessel 125 (e.g., bowl 125), a forming vessel 135 (e.g., isopipe 135), a pull roll apparatus 140 and a traveling anvil machine (TAM) 150.

The melting vessel 110 is where the glass batch materials are introduced as shown by arrow 112 and melted to form molten glass 126. The fining vessel 115 (e.g., finer tube 115) has a high temperature processing area that receives the molten glass 126 (not shown at this point) from the melting vessel 110 and in which bubbles are removed from the molten glass 126. The fining vessel 115 is connected to the mixing vessel 120 (e.g., stir chamber 120) by a finer to stir chamber connecting tube 122. And, the mixing vessel 120 is connected to the delivery vessel 125 by a stir chamber to bowl connecting tube 127. The delivery vessel 125 delivers the molten glass 126 through a downcorner 130 to an inlet 132 and into the forming vessel 135 (e.g., isopipe 135).

The forming vessel 135 which is shown in more detail in FIG. 2 (PRIOR ART) includes an opening 136 that receives the molten glass 126 which flows into a trough 137 and then overflows and runs down two sides 138a and 138b before fusing together at what is known as a root 139. The root 139 is where the two sides 138a and 138b come together and where the two overflow walls of molten glass 126 rejoin (e.g., refuse) before being drawn downward by the traditional pull roll apparatus 140 to form the glass sheet 105. Then, the TAM 150 scores the drawn glass sheet 105 so it can be separated into distinct pieces of glass sheets 155.

As shown in FIG. 2 (PRIOR ART), the exemplary traditional pull roll apparatus 140 includes a first pull roll 142 (having two ends 142a and 142b coated with a compressible refractory roll covering) and a second pull roll 144 (having two ends 144a and 144b coated with a compressible refractory roll covering) which extend across the glass sheet 105 and draw the edges 105a and 105b of the glass sheet 105 (note: FIG. 2 is not to scale). The traditional pull roll apparatus 140 also has a first motor 146 operatively connected to the first pull roll 142 and a second motor 148 operatively connected to the second pull roll 142. Plus, the traditional pull roll apparatus 140 has a device 149 (e.g., computer, programmable logic controller, variable frequency drives) that controls the velocities (revolutions per minute) of motors 146 and 148 to cause the two pull rolls 142 and 144 to draw or stretch the glass sheet 105 (at this point a visco-elastic glass sheet 105) to the desired final thickness. In addition, the traditional pull roll apparatus 140 may include a pair of bare idling rolls 152 and 154 (located below the first and second pull rolls 142 and 144) which have ends 152a, 152b, 154a and 154b that help stabilize and reduce the motion of the glass sheet 105 when the TAM 150 scores the glass sheet 105 and when the scored glass sheet 105 is separated into individual glass sheets 155 (see FIG. 1) (note: for clarity the brackets/supports that hold the pull rolls 142, 144, 152 and 154 have not been shown).

Although the traditional pull roll apparatus 140 works well to draw the glass sheet 105 to the desired thickness there is still a desire to develop a new and improved pulling roll assembly that can draw the glass sheet and at the same time improve the flatness of the glass sheet and also reduce the residual stress within the glass sheet. These particular needs and other needs have been satisfied by the pull roll apparatus and method of the present invention.

SUMMARY

In one aspect, the present invention includes a pull roll apparatus that has a first stub roll pair, a second stub roll pair and a control device (e.g., programmable logic controller) which controls the first stub roll pair and the second stub roll pair while a first edge portion of the glass sheet is drawn between two rolls associated with the first stub roll pair and while an opposing second edge portion of the glass sheet is drawn between two rolls associated with the second stub roll pair. The rolls associated with the first and second stub roll pairs can either be vertically downtilted rolls or horizontally level rolls with respect to the glass sheet. If desired, the pull roll apparatus may include a pulling roll assembly (located below the first and second stub roll pairs) or two additional stub roll pairs (located below the first and second stub roll pairs).

In another aspect, the present invention includes a method for manufacturing a glass sheet by: (1) melting batch materials and forming the glass sheet; (2) delivering the glass sheet to a pull roll apparatus; and (3) using the pull roll apparatus to draw the glass sheet. The pull roll apparatus includes a first stub roll pair, a second stub roll pair and a control device (e.g., programmable logic controller) which controls the first stub roll pair and the second stub roll pair while a first edge portion of the glass sheet is drawn between two rolls associated with the first stub roll pair and while an opposing second edge portion of the glass sheet is drawn between two rolls associated with the second stub roll pair. The rolls associated with the first and second stub roll pairs can either be vertically downtilted rolls or horizontally level rolls with respect to the glass sheet. If desired, the pull roll apparatus may include a pulling roll assembly (located below the first and second stub roll pairs) or two additional stub roll pairs (located below the first and second stub roll pairs).

In yet another aspect, the present invention includes a glass manufacturing system that comprises: (1) at least one vessel for melting batch materials and forming molten glass; (2) an isopipe for receiving the molten glass and forming a glass sheet; and (3) a pull roll apparatus for receiving the glass sheet and then drawing the glass sheet. The pull roll apparatus includes a first stub roll pair, a second stub roll pair and a control device (e.g., programmable logic controller) which controls the first stub roll pair and the second stub roll pair while a first edge portion of the glass sheet is drawn between two rolls associated with the first stub roll pair and while an opposing second edge portion of the glass sheet is drawn between two rolls associated with the second stub roll pair. The rolls associated with the first and second stub roll pairs can either be vertically downtilted rolls or horizontally level rolls with respect to the glass sheet. If desired, the pull roll apparatus may include a pulling roll assembly (located below the first and second stub roll pairs) or two additional stub roll pairs (located below the first and second stub roll pairs).

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein:

FIGS. 4A-4H are several diagrams illustrating a pull roll apparatus in accordance with a first embodiment of the present invention;

DETAILED DESCRIPTION

Referring to FIGS. 3-7, there are disclosed several embodiments of a pull roll apparatus 440, 540, 640 and 740 that is configured and operated in accordance with the present invention. Although each pull roll apparatus 440, 540, 640 and 740 is described herein as being used within a glass manufacturing system 300 that uses a downdraw fusion process to make a glass sheet 305, it should be understood that each pull roll apparatus 440, 540, 640 and 740 could be used within any type of glass manufacturing system that draws a glass sheet 305. Accordingly, the pull roll apparatus 440, 540, 640 and 740 of the present invention should not be construed in a limited manner.

Figure 3:
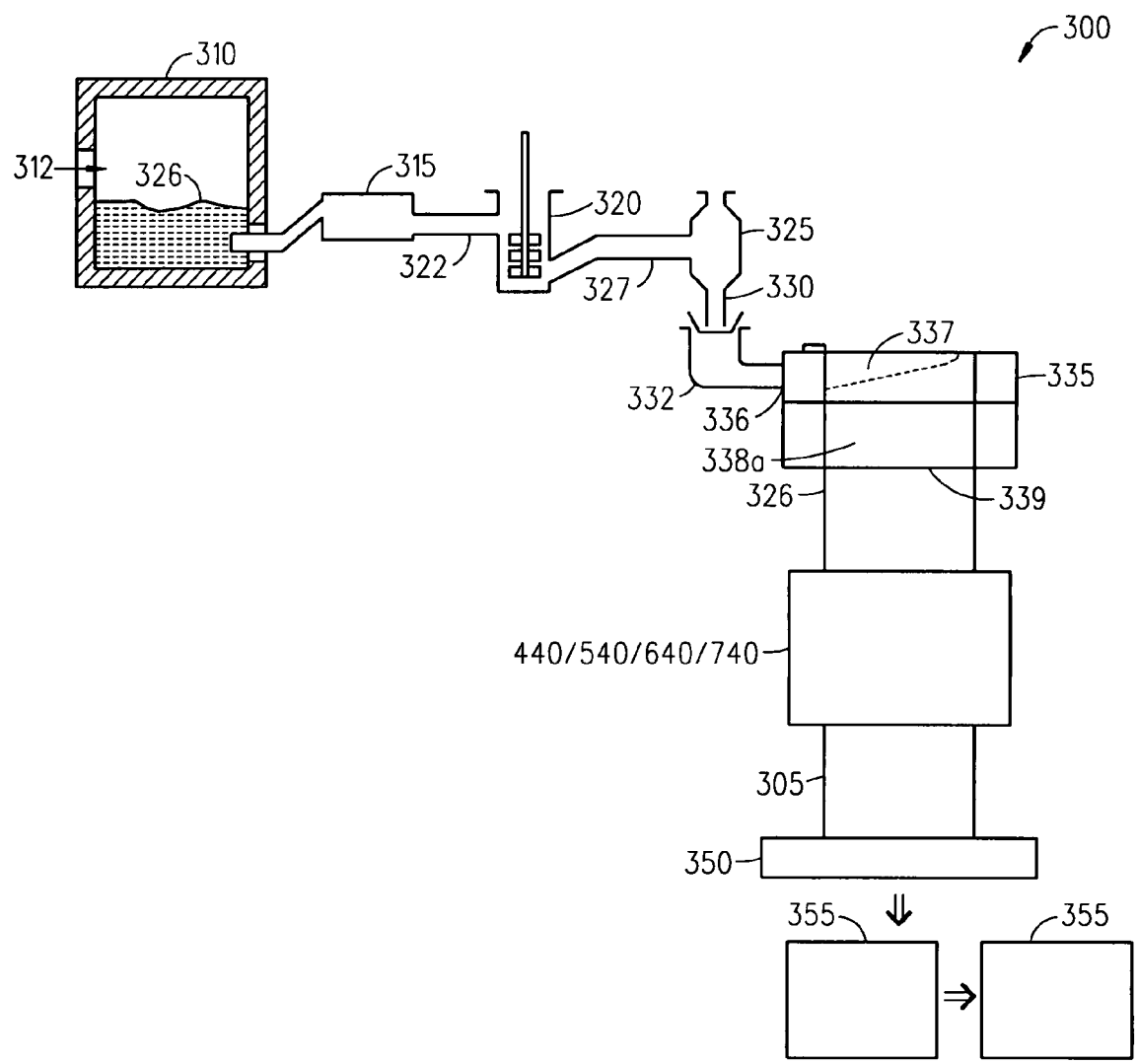
FIG. 3 is a diagram illustrating an exemplary glass manufacturing system and a new pull roll apparatus that are fused to manufacture a glass sheet in accordance with the present invention.

Referring to FIG. 3, there is shown a schematic view of an exemplary glass manufacturing system 300 that uses the fusion process and the new pull roll apparatus 440, 540, 640 or 740 to manufacture a glass sheet 305 in accordance with the present invention. The glass manufacturing system 300 includes a melting vessel 310, a fining vessel 315, a mixing vessel 320 (e.g., stir chamber 320), a delivery vessel 325 (e.g., bowl 325), a forming vessel 335 (e.g., isopipe 335), a pull roll apparatus 440, 540, 640 or 740 and a TAM 350.

The melting vessel 310 is where the glass batch materials are introduced as shown by arrow 312 and melted to form molten glass 326. The fining vessel 315 (e.g., finer tube 315) has a high temperature processing area that receives the molten glass 326 (not shown at this point) from the melting vessel 310 and in which bubbles are removed from the molten glass 326. The fining vessel 315 is connected to the mixing vessel 320 (e.g., stir chamber 320) by a finer to stir chamber connecting tube 322. And, the mixing vessel 320 is connected to the delivery vessel 325 by a stir chamber to bowl connecting tube 327. The delivery vessel 325 delivers the molten glass 326 through a downcorner 330 to an inlet 332 and into the forming vessel 335 (e.g., isopipe 335). The forming vessel 335 includes an opening 336 that receives the molten glass 326 which flows into a trough 337 and then overflows and runs down two sides 338a and 338b before fusing together at what is known as a root 339. The root 339 is where the two sides 338a and 338b come together and where the two overflow walls of molten glass 326 rejoin (e.g., refuse) before being drawn downward by the pull roll apparatus 440, 540, 640 or 740 to form the glass sheet 305. Then, the TAM 350 scores the drawn glass sheet 305 which is then separated into individual glass sheets 355.

Figure 1:
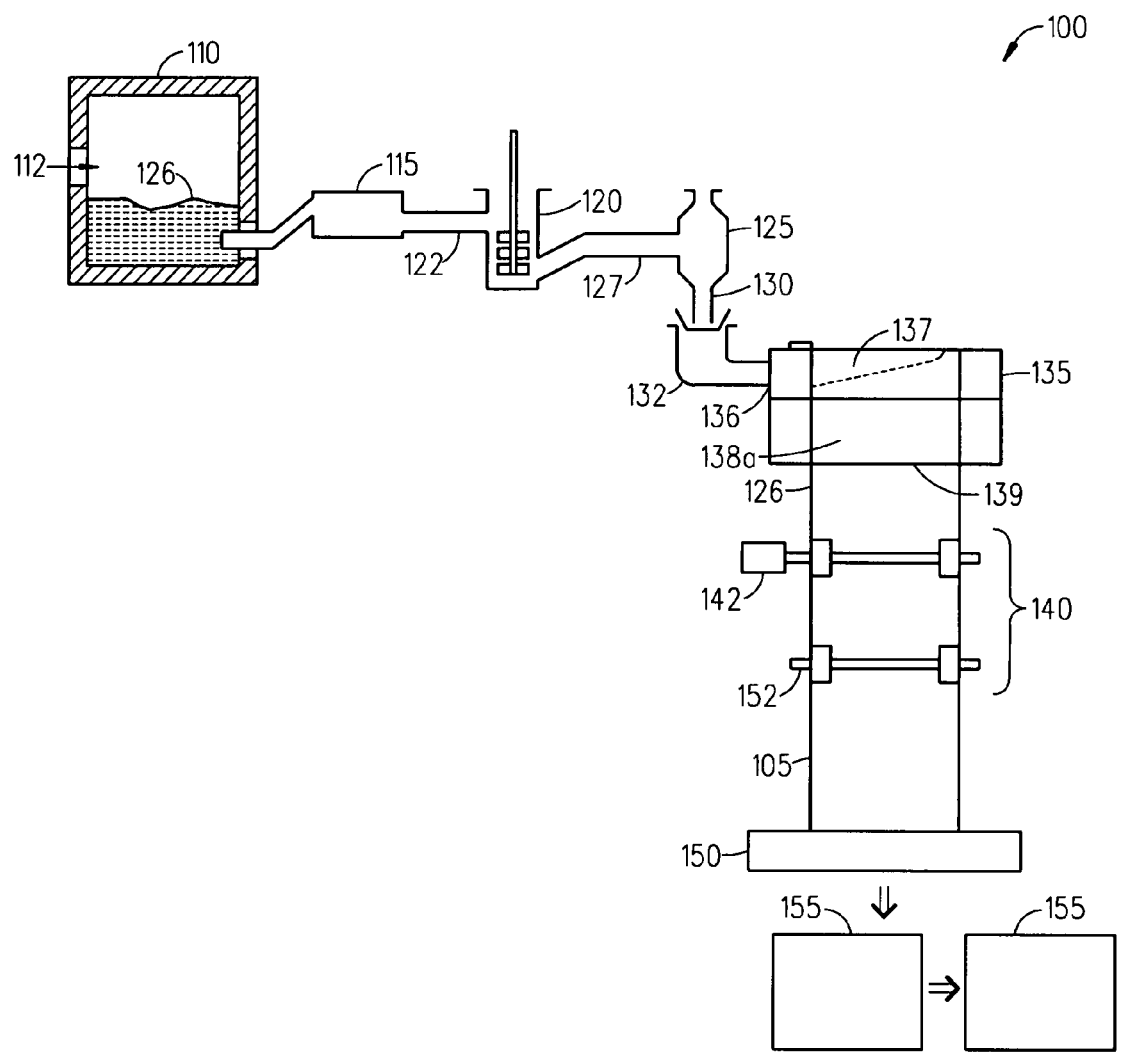
FIGS. 1 and 2 (PRIOR ART) are diagrams illustrating an exemplary glass manufacturing system and a traditional pull roll apparatus that are used to manufacture a glass sheet.
Figure 2:
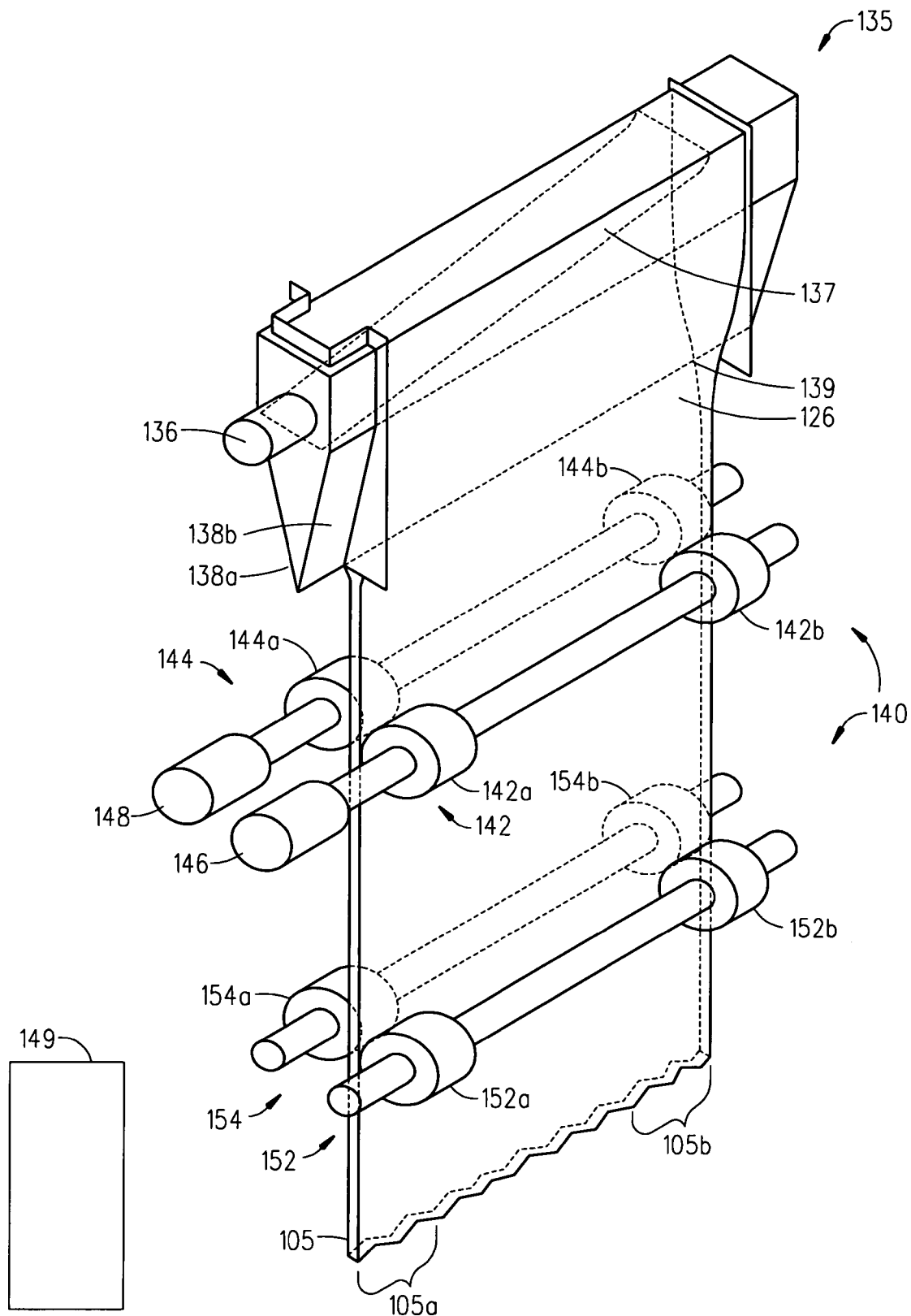

The glass manufacturing system 300 and in particular the aforementioned components 310, 315, 320, 325, 335 and 350 are connected to one another and function the same as the corresponding components 110, 115, 120, 125, 135 and 150 described above with respect to the glass manufacturing system 100 shown in FIG. 1 except that the new pull roll apparatus 440, 540, 640 and 740 is a marked improvement over the traditional pull roll apparatus 140. As discussed below, the new pull roll apparatus 440, 540, 640 and 740 is configured so that it can be used to control and improve the consistency of a cross-draw tension and/or down-draw sheet tension in the glass sheet 305 which reduces residual glass stress and improves glass flatness of the manufactured glass sheet 305. More specifically, the pull roll apparatus 440, 540, 640 and 740 can be used to control and improve the consistency of the cross-draw tension and/or down-draw sheet tension in the area where the glass sheet 305 (also known as ribbon 305) is going through a visco-elastic transformation. This area is defined as the setting zone which is where product stress and flatness are set in the glass sheet 305. Unfortunately, the traditional pull roll apparatus 140 was not configured so one could control the cross-draw tension in the glass sheet 105. Further, the traditional pulling roll apparatus 140 causes significant instantaneous force variability known as wind-up forces which result from driving multiple roll flats at a constant speed. Moreover, the traditional pulling roll apparatus 140 can be impacted from a variable ribbon load from the sheet cutoff process which can result in changes to the sag of the shafts that cause variable cross-draw forces and can result in inconsistent product flatness and stress. However, the new pull roll apparatus 440, 540, 640 and 740 can control and adjust the cross-draw tension in the glass sheet 305 to any level desired while the down-draw tension can be adjusted or held constant while manufacturing the glass sheet 305. A detailed discussion about each pull roll apparatus 440, 540, 640 and 740 is provided below with respect to FIGS. 4-7.

Figure 4A:
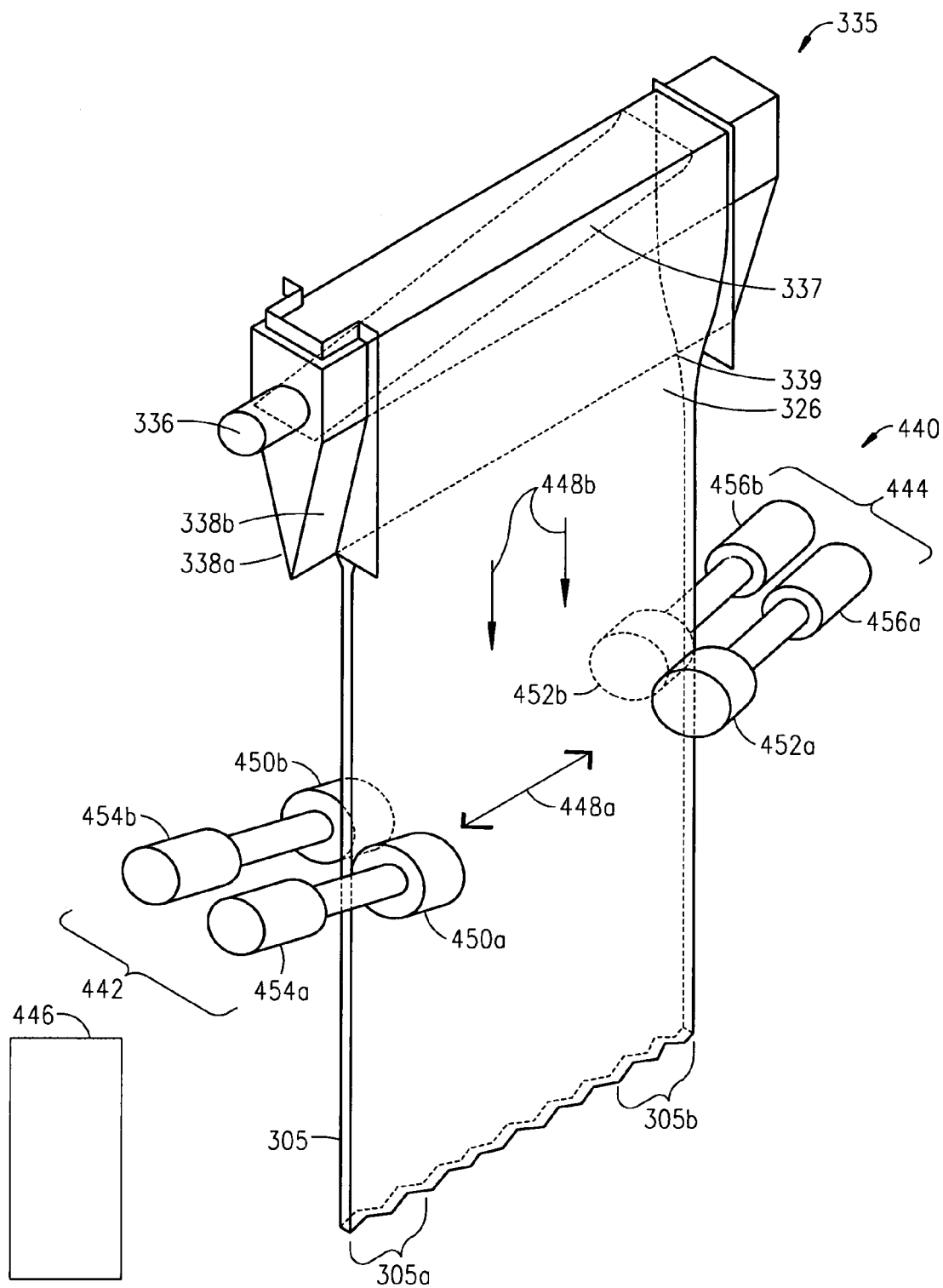
Figure 4B:
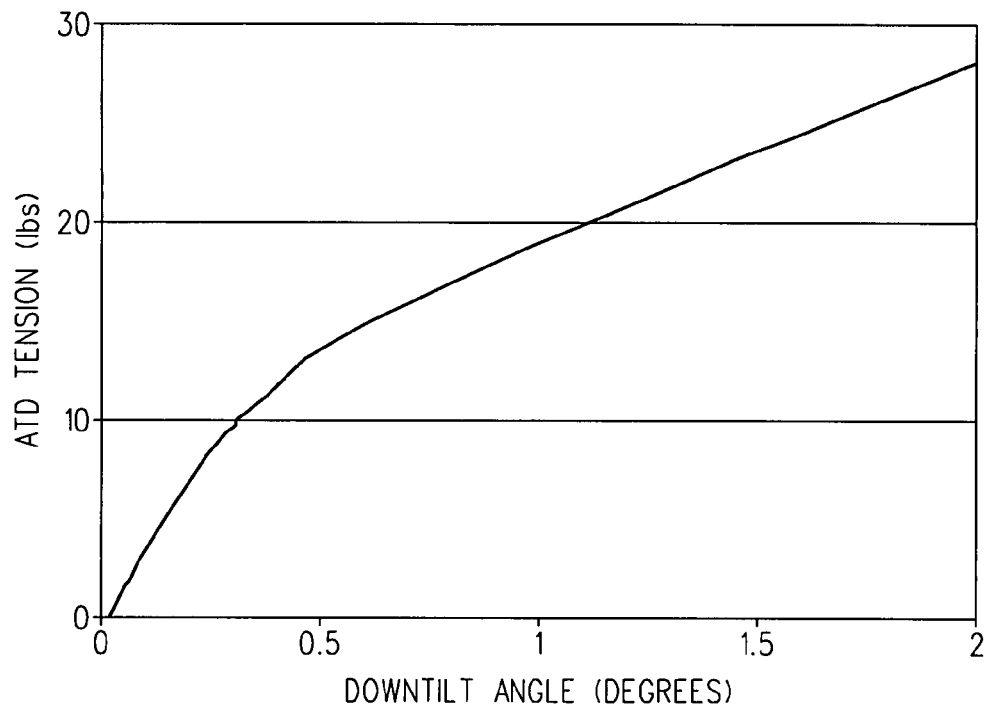

Referring to FIGS. 4A-4G, there are several diagrams associated with the pull roll apparatus 440 that is configured in accordance with a first embodiment of the present invention. As shown in FIG. 4A, the pull roll apparatus 440 includes a first cantilevered driven stub roll pair 442, a second cantilevered driven stub roll pair 444 and a control device 446 (e.g., computer 446, programmable logic controller 446) (note: FIG. 4A is not to scale). The device 446 controls the two driven stub roll pairs 442 and 444 while a first edge portion 305a of the glass sheet 305 is drawn between two vertically downtilted rolls 450a and 450b which are associated with the first driven stub roll pair 442 and while an opposing second edge portion 305b of the glass sheet 305 is drawn between two vertically downtilted rolls 452a and 452b which are associated with the second driven stub roll pair 444 (see FIG. 4E). The stub roll pairs are vertically downtilted in order to create a cross-draw tension, as well as a down-draw tension in the glass sheet 305. In these examples, the two driven stub roll pairs 442 and 444 are not positioned to have an uptilt because this would cause an undesirable compressive force across the glass sheet 305 which would deform and stress the glass sheet 305. In addition, it may be desirable to downtilt the rolls 450a and 450b on one side differently than the rolls 452a and 452b on the other side depending on the processing conditions (note: pull roll apparatus 740 discussed with respect to FIGS. 7A-7B does not have vertically downtilted rolls 450a, 450b, 452a and 452b but instead has horizontally level rolls 450a, 450b, 452a and 452b).

In addition, the device 446 (along with an automatic positioner like an air-cylinder or other type of positioning actuator) or instead a simple manual mechanism may be used to adjust the downtilt position of the vertically downtilted rolls 450a, 450b 452a and 452b so as to control (or tune) the average cross-draw tension force 448a across the glass sheet 305 (see experimental results shown in FIG. 4B where the preferred downtilt angle "x" was in the range of 1.5° for the tested exemplary pull roll apparatus 440)(note: this controlling of a cross-draw tension is true for the downtilted rolls 606a, 606b, 608a and 608b associated with the pull roll assembly 640). The capability of the pull roll apparatus 440 to manage the tension effects including the cross-draw tension 448a and down-draw tension 448b within the setting zone where there is a visco-elastic glass sheet 305 would be very helpful in drawing the glass sheet 305 to the desired thickness while at the same time improving the flatness of the glass sheet 305 and reducing the residual stress within the glass sheet 305. Plus, since there can be differences in the glass viscosity delivered from end to end in the isopipe 335, the individual driven and controlled stub roll pairs 442 and 444 enables one to account for this inherent imbalance in the glass viscosity which may be caused by the isopipe 335. Moreover, the pull roll apparatus 440 has a configuration which would allow for the adjustment of the glass tension 448a and 448b over the roll life which could help to stabilize the downdraw process and significantly extend the life of the downtilt rolls 450a, 450b, 452a and 452b.

Figure 4C:
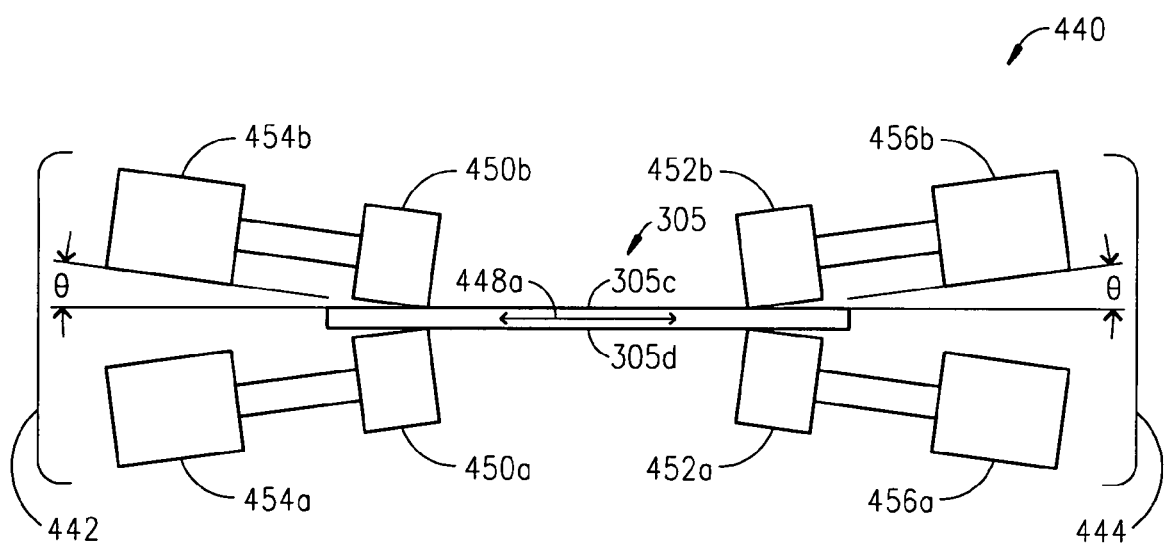
Figure 4D:
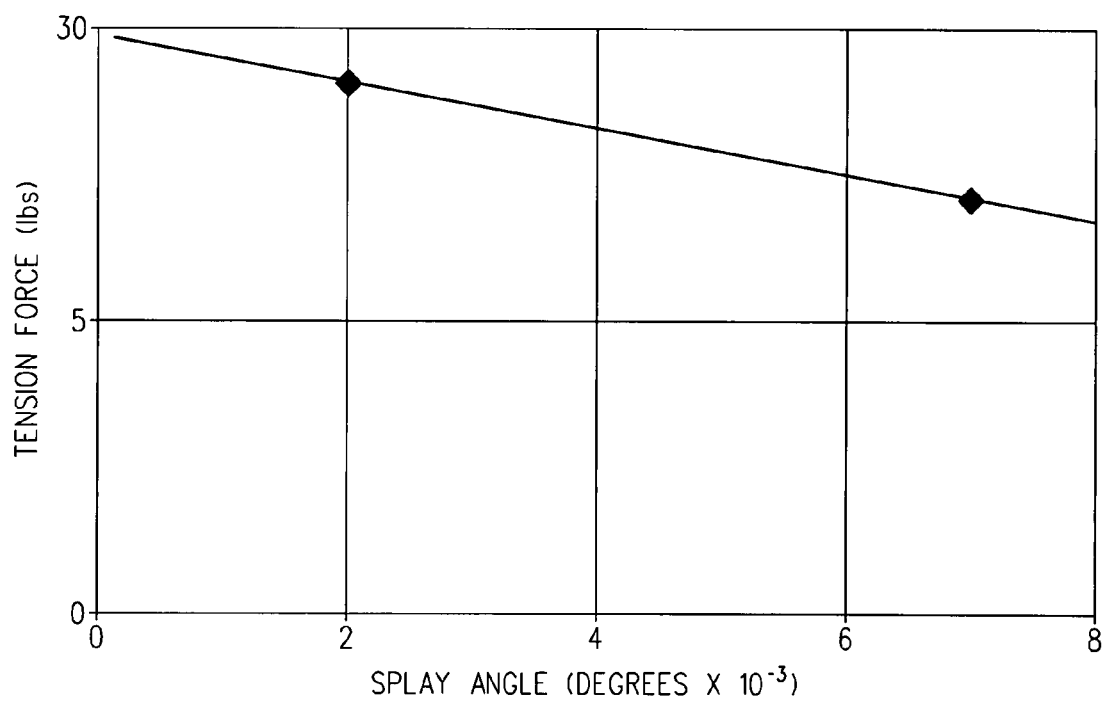
Figure 7A:
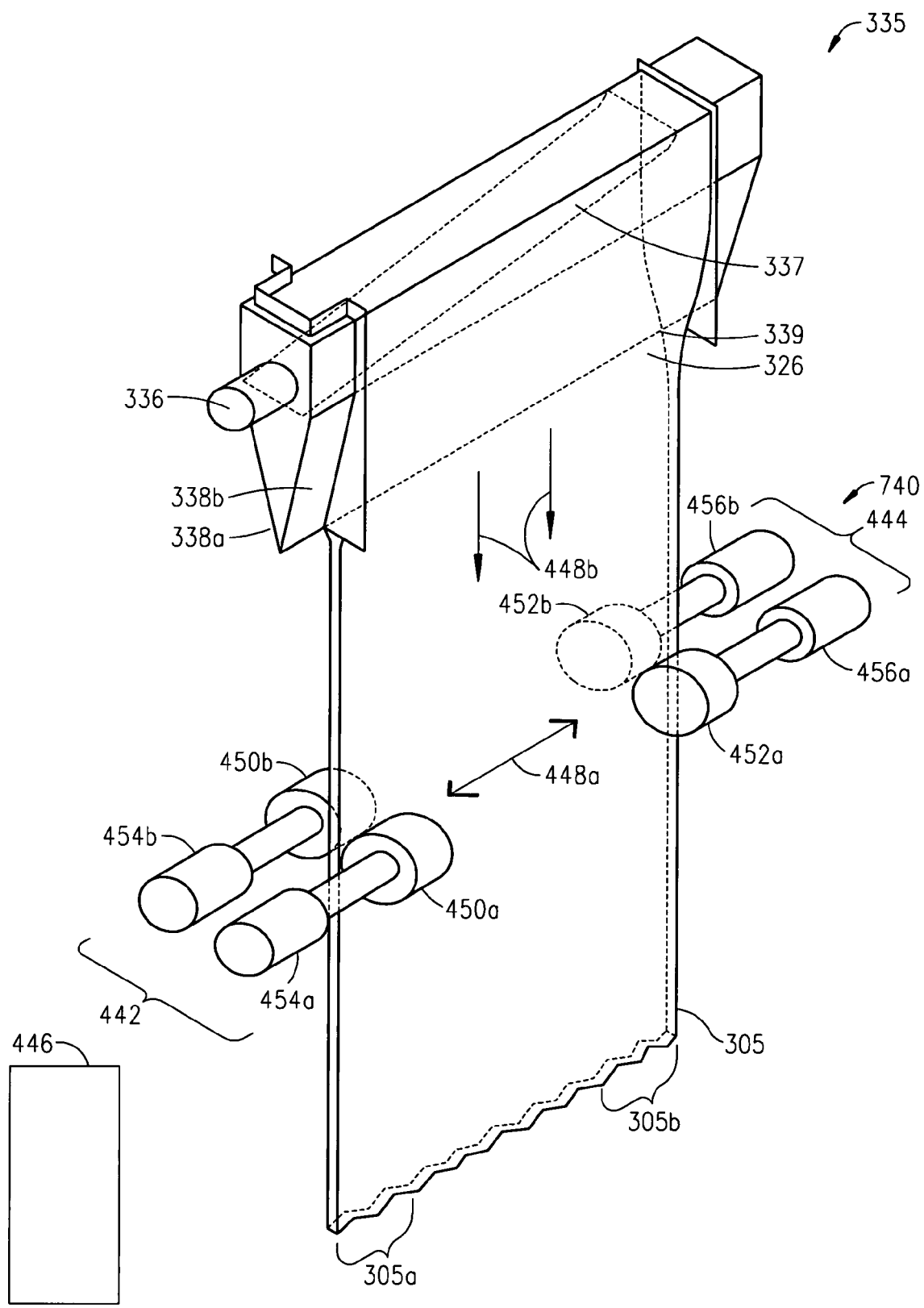
FIGS. 7A-7B are diagrams illustrating a pull roll apparatus in accordance with a fourth embodiment of the present invention.
Figure 7B:
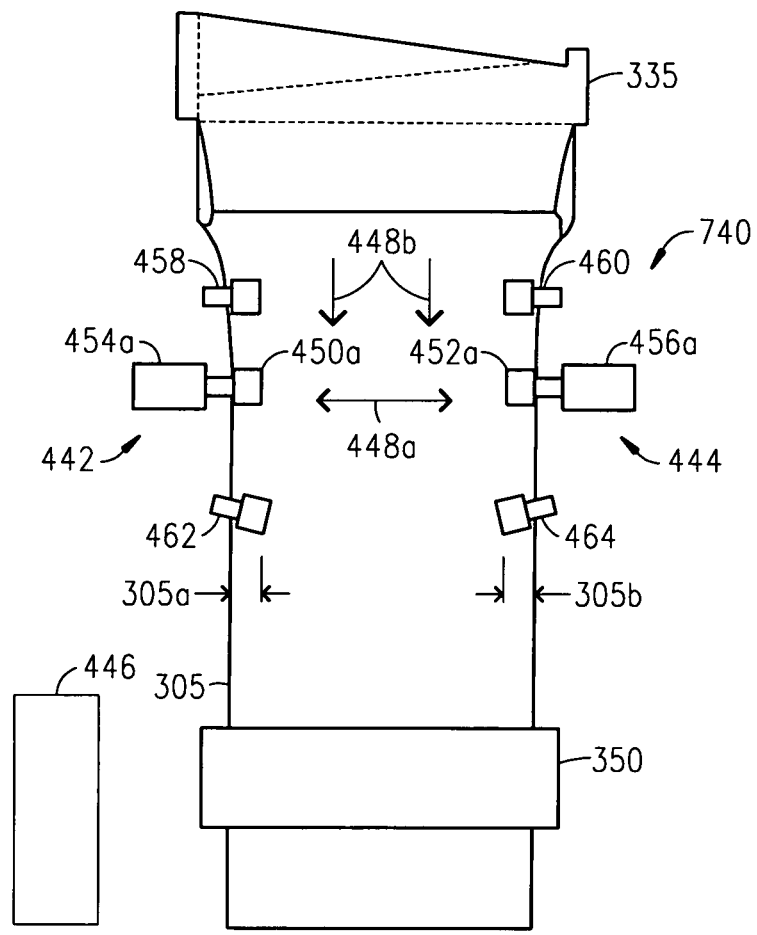

If desired, the vertically downtilted rolls 450a, 450b, 452a and 452b can also be positioned to have a predetermined splay angle which is a horizontal angle θ that a respective face of the downtilted rolls 450a, 450b, 452a and 452b would be positioned relative to a respective major surface 305c and 305d of the glass sheet 305 (see FIG. 4C) (note: the pull roll apparatus 740 discussed with respect to FIGS. 7A-7B has horizontally level rolls 450a, 450b, 452a and 452b and these particular rolls if desired can also be positioned to have a predetermined splay angle). The positioning of the vertically downtilted rolls 450a, 450b, 452a and 452b to have a desired splay angle θ could further help to control the amount of cross-draw force 448a which is generated across the glass sheet 305. A positive splay angle θ generates a cross-draw tension 448a which is preferred (see experimental results of tension vs. splay angle shown in FIG. 4D where the tested exemplary pull roll apparatus 440 had a splay angle which in effect is a contact angle at the roll flat that was in the range of 0.007 in/in). In contrast, a negative splay angle θ generates a compressive force across the glass sheet 304 which is not preferred since such a force would deform and stress the glass sheet 305 (note: FIG. 4C shows a pull roll apparatus 440 with a positive splay angle θ). The pull roll apparatus 440 can be configured such that the adjustment to the desired splay angle ↳ can be made manually (preferred) or automatically (possible) by using for example an air cylinder or other type of positioning actuator. It should be appreciated that the roll flats of the downtilted rolls 450a, 450b, 452a and 452b often run on the waste portion of the glass sheet 126, where the waste portion often tapers in thickness. This glass tapering generally reduces cross-draw tension levels generated at the downtilted rolls 450a, 450b, 452a and 452b. However, the ability to adjust the splay angle θ is helpful in offsetting this taper affect and maintaining a desirable high level of cross-draw tension (note: the pull roll apparatus 740 discussed below has horizontally level rolls 450a, 450b, 452a and 452b and these rolls also often run on the waste portion of the glass sheet 126).

In this pull roll apparatus 440 (and the other pull roll assemblies 540, 640 and 740 discussed below) it should be appreciated that the respective motors can be servo motors which may or may not use a gear box to drive the respective rolls. The servo motors can provide torque and/or speed measurements back to the control device 446 (e.g., programmable logic controller 446) which are then used by the control device 446 to implement a desired control scheme (various control schemes are discussed next). Alternatively, the control device 446 can interact with other types of motor controllers such as variable frequency drives to control the speed and/or torque of the respective motors. In this situation, torque sensors and/or speed sensors would be used to measure the same and can be coupled inline with an axle between the respective motors/gearboxes/rolls. Plus, in this pull roll apparatus 440 (and the other pull roll assemblies 540, 640 and 740 discussed below) a tension device may be used to measure or indirectly measure the cross-draw tension 448a in the glass sheet 305 so the control device 446 can interact with a mechanical device and adjust the position of the rolls 450a, 450b, 452a and 452b to have a desired downtilt angle to control the cross-tension 448a during the drawing process (note: the rolls 450a, 450b, 452a and 452b can also be manually or automatically adjusted to have a desired downtilt angle to control the cross-tension 448a). For example, the cross-draw tension device may be a load cell or similar device that is placed in the mounting/support structures of the first and second driven stub roll pairs 442 and 444 (note: for clarity the brackets/supports that hold the various rolls within the pull roll assemblies 440, 540, 640 and 740 have not been shown).

In operation, the device 446 can implement anyone of a number of control schemes to effectively control the down-draw tension 448b in the glass sheet 305 by controlling the velocity and/or torque of the two driven stub roll pairs 442 and 444. FIGS. 4E-4F are provided to help explain one exemplary control scheme that can be implemented by the pull roll assembly 440 to effectively control/adjust the down-draw tension 448b within the glass sheet 305. In this case, the device 446 (e.g., programmable logic controller 446) controls velocities (revolutions per minute) of motors 454a and 456a which are operatively connected to the downtilted rolls 450a and 452a and further controls torques of motors 454b and 456b which are operatively connected to the other downtilted rolls 450b and 452b. In particular, the device 446 controls the master motors 454a and 456a to operate at a prescribed angular velocity and then monitors the torque of the master motors 454a and 456a so that it can control the torque of the slave motors 454b and 456b to match a predetermined percentage of the measured torque of the corresponding master motors 454a and 456a. For instance, the device 446 can control the slave motors 454b and 456b to output a torque that is 50-100% of the monitored torque of the master motors 454a and 456a. If desired, the device 446 can have one master motor 454a operating at a different velocity then the other master motor 456a to take into account any process asymmetries.

Another exemplary control scheme that can be implemented by the pull roll apparatus 440 to effectively control/adjust the down-draw tension 448b within the glass sheet 305 is described next with the aid of FIGS. 4E and 4G. In this case, the device 446 (e.g., programmable logic controller 446) controls the velocities (revolutions per minute) of all four motors 454a, 454b, 456a and 456b which are operatively connected to the four downtilted rolls 450a, 450b, 452a, and 452b. In particular, the device 446 controls all four motors 454a, 454b, 456a and 456b to have the same setpoint velocity in order to control/adjust the down-draw tension 448b while drawing the glass sheet 305 between the four downtilted rolls 450a, 450b, 452a and 452b. If desired, the device 446 can have the motors 454a and 454b on one side operating at a different velocity then the motors 456a and 456b located on the other side to take into account any process asymmetries. Further, the velocities of the motors on either side of the glass sheet 305 can be set at different control velocities to offset differences in roll geometries (e.g., motor 454a could be operated at a different velocity than motor 454b). This constant velocity control scheme does have one drawback in that it cause some wind-up forces to arise because of small geometrical/size variations in the rolls 450a, 450b, 452a and 452b. However, this constant velocity control scheme is easy to implement and may be acceptable for some applications. In contrast, the control scheme associated with FIG. 4F is the preferred scheme, because the control system eliminates roll to roll wind-up and prevents these undesirable variations.

Still yet another exemplary control scheme that can be implemented by the pull roll apparatus 440 to effectively control/adjust the down-draw tension 448b within the glass sheet 305 while eliminating roll-to-roll wind-up is described next with the aid of FIG. 4H. In this case, the device 446 (e.g., programmable logic controller 446) controls the velocities (revolutions per minute) of two motors 454a and 456a which are operatively connected to the two downtilted rolls 450a and 452a while the other two downtilted rolls 450b and 452b freely turn or idle because they do not have motors (or the motors are disengaged, by for example, a clutch system). In particular, the device 446 controls the two motors 454a and 456a to have the same setpoint velocity in order to control/adjust the down-draw tension 448b while drawing the glass sheet 305 between the four downtilted rolls 450a, 450b, 452a and 452b. If desired, the device 446 can have the motor 454a on one side operating at a different velocity then the motor 456a located on the other side to take into account any process asymmetries. This control scheme is desirable for its simplicity and lower cost and may allow for acceptable performance in some applications.

The pull roll apparatus 440 has several advantages relative to the traditional pull roll apparatus 140. For instance, the first and second driven stub roll pairs 442 and 444 effectively enable: (1) the tuning of the cross-draw tension 448a to reduce stress and warp in the glass sheet 305; and (2) the elimination or reduction of roll wind-up forces. It should be appreciated that the pulling roll apparatus 440 may also include optional pair(s) of edge rolls 458 and 460 and/or optional pair(s) of idle stub rolls 462 and 464 (see FIG. 4E).

Figure 5A:
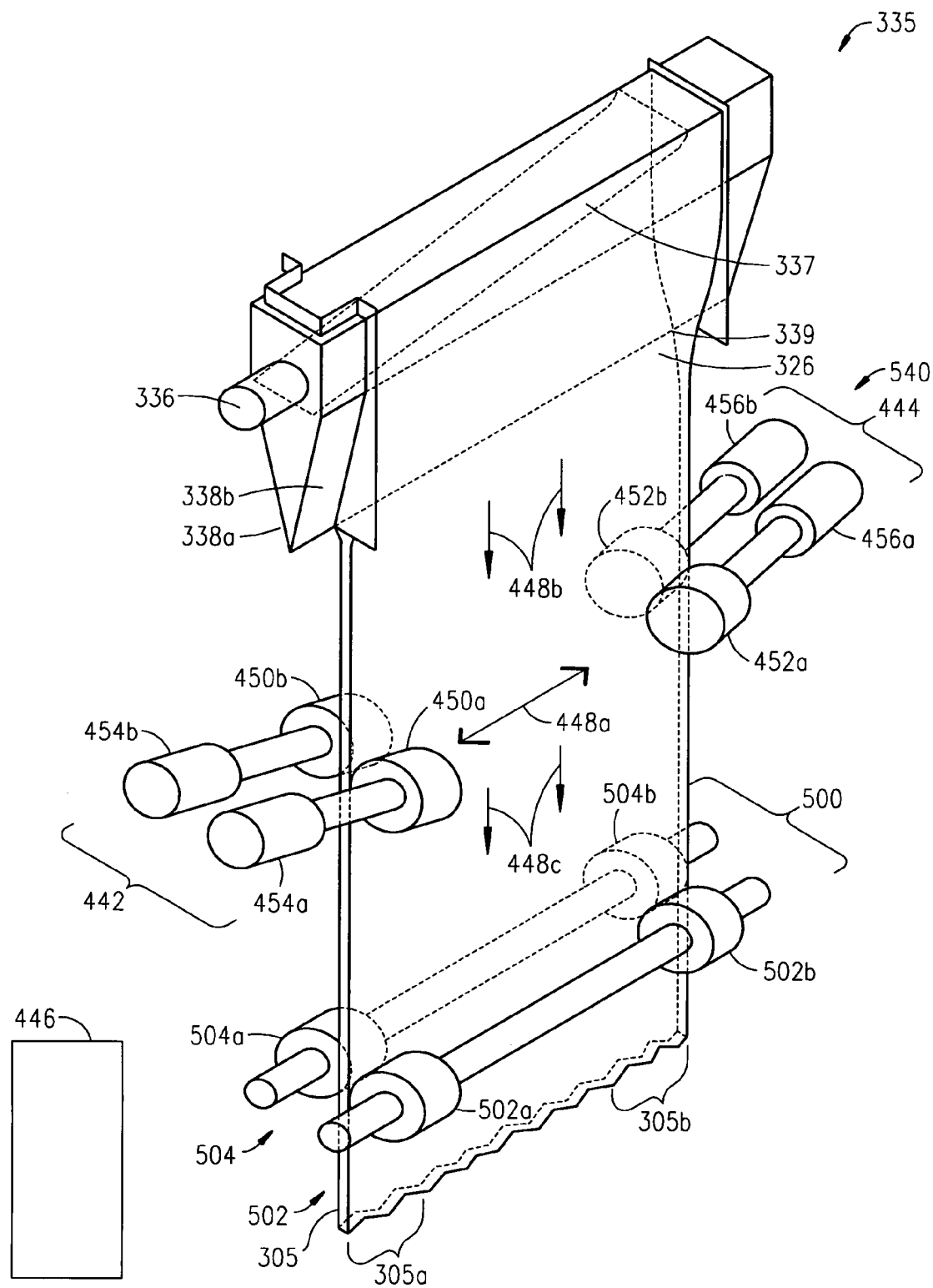
FIGS. 5A-5E are several diagrams illustrating a pull roll apparatus in accordance with a second embodiment of the present invention.

Referring to FIGS. 5A-5E, there are several diagrams associated with the pull roll apparatus 540 that is configured in accordance with a second embodiment of the present invention. As shown in FIG. 5A, the pull roll apparatus 540 includes a new pulling roll assembly 500 in addition to the components associated with the first described pull roll apparatus 440 namely a first cantilevered driven stub roll pair 442, a second cantilevered driven stub roll pair 444 and a control device 446 (e.g., computer 446, programmable logic controller 446) (note: FIG. 5A is not to scale). The pulling roll assembly 500 includes a first pull roll 502 (having two ends 502a and 502b optionally coated with a compressible refractory roll covering) and a second pull roll 504 (having two ends 504a and 504b optionally coated with a compressible refractory roll covering) which extend across the glass sheet 305 and draw the edges 305a and 305b of the glass sheet 305. The device 446 operates the pulling roll assembly 500, the first cantilevered driven stub roll pair 442 and the second cantilevered driven stub roll pair 444 to control and improve the consistency of the down-draw sheet tension 448b which reduces residual stress and improves glass flattening while the glass sheet 305 is being manufactured. The addition of the pull roll assembly 500 also give rise to the ability to control different sets of down-draw tensions 448b and 448c within the ribbon. For instance, the stub roll pairs 442 and 444 can control the down-draw tension 448b in the ribbon located between themselves and the isopipe 335, and the pull roll assembly 500 can control the down-draw tension 448c in the ribbon located between themselves and the stub roll pairs 442 and 444. The device 446 can implement anyone of a number of control schemes to effectively control the down-draw tensions 448b and 448c in the glass sheet 305 by controlling the velocity, splay angle, downtilt angle and/or torque of the pulling roll assembly 500 and/or the two downtilted driven stub roll pairs 442 and 444. Several exemplary control schemes are discussed in detail next with respect to FIGS. 5B-5E.

Figures 5B, 5C:
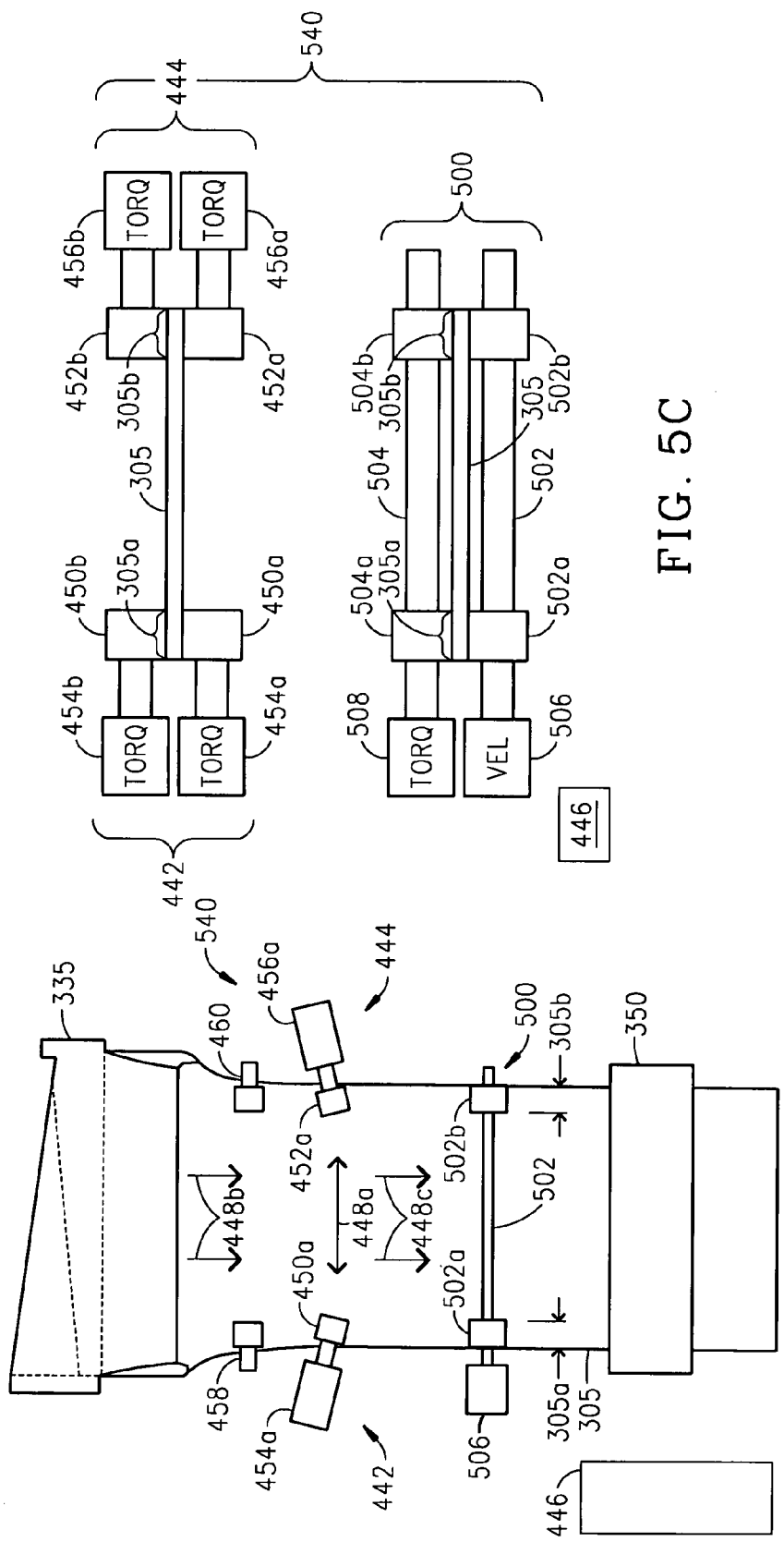

An exemplary control scheme that can be implemented by the pull roll apparatus 540 to effectively control/adjust the down-draw tensions 448b and 448c within the glass sheet 305 is described next with the aid of FIGS. 5B-5C. In this case, the device 446 (e.g., programmable logic controller 446) controls a velocity (revolutions per minute) of a master motor 506 which is operatively connected to the first pull roll 502 and further controls a torque of a slave motor 508 operatively connected to the second pull roll 504 and then controls the torque output from slave motors 454a, 454b, 456a and 456b which are operatively connected to the downtilted rolls 450a, 450b, 452a and 452b of the first and second driven stub roll pairs 442 and 444. In particular, the device 446 controls the master motor 506 to operate at a prescribed angular velocity and then monitors the torque of the master motor 506 so that it can control the torques of the slave motors 508, 454a, 454b, 456a and 456b to match a predetermined percentage of the measured torque of the master motor 506. For instance, the device 446 can control the slave motor 508 to output a torque that is 50-100% of the monitored torque of the master motor 506 and further control the slave motors 454a, 454b, 456a and 456b to output torque that is 0-10% of the monitored torque of the master motor 506.

Figure 5D:
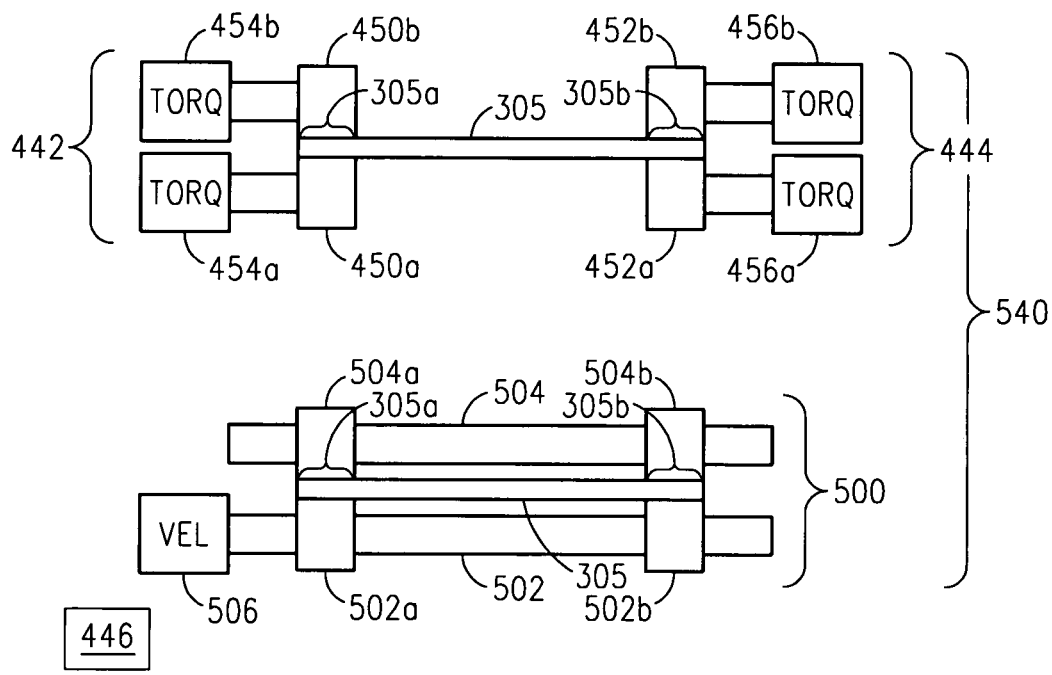

Another exemplary control scheme that can be implemented by the pull roll apparatus 540 to effectively control/adjust the down-draw tensions 448b and 448c within the glass sheet 305 is described next with the aid of FIGS. 5B and 5D In this case, the device 446 (e.g., programmable logic controller 446) controls a velocity (revolutions per minute) of the master motor 506 which is operatively connected to the first pull roll 502 and further controls the torque output from the slave motors 454a, 454b, 456a and 456b which are operatively connected to the downtilted rolls 450a, 450b, 452a and 452b of the first and second driven stub roll pairs 442 and 444. In particular, the device 446 controls the master motor 506 to operate at a prescribed angular velocity and then monitors the torque of the master motor 506 so that it can control the torques of the slave motors 454a, 454b, 456a and 456b to match a predetermined percentage of the measured torque of the master motor 506. For instance, the device 446 can control the slave motors 454a, 454b, 456a and 456b to output torque that is 0-10% of the monitored torque of the master motor 506. As can be seen, the second pull roll 504 has no motor but it could have a motor (if desired) that applies just enough torque to offset the bearing friction in the second pull roll 504).

Figure 5E:
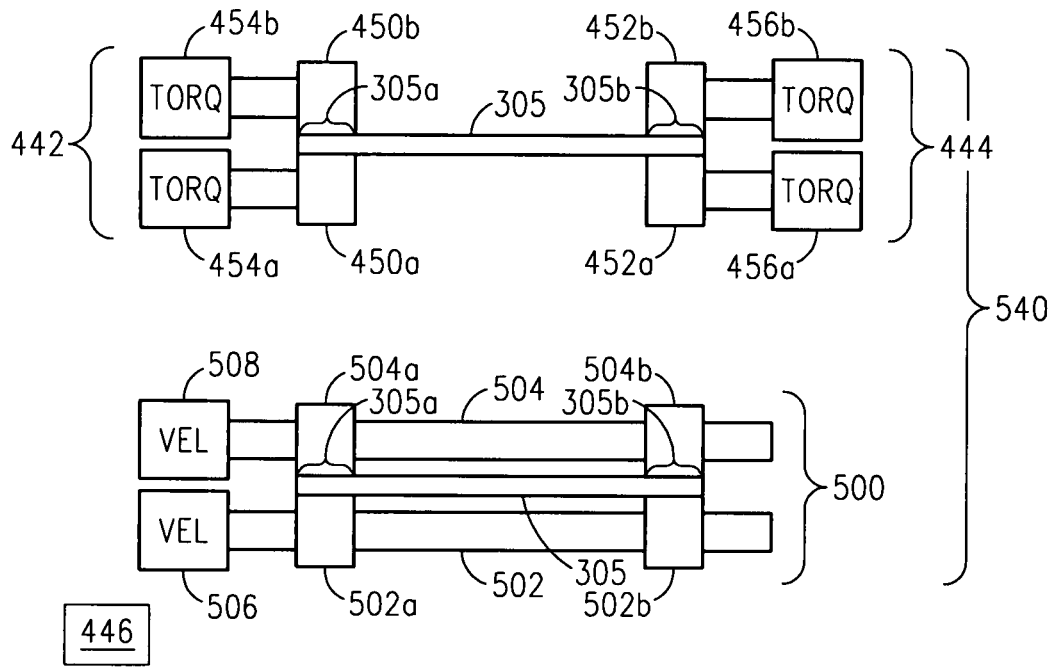

Yet another exemplary control scheme that can be implemented by the pull roll apparatus 540 to effectively control/adjust the down-draw tensions 448b and 448c and cross-draw tension variability 448a within the glass sheet 305 is described next with the aid of FIGS. 5B and 5E. In this case, the device 446 (e.g., programmable logic controller 446) controls velocities (revolutions per minute) of master motors 506 and 508 which are operatively connected to the first and second pull rolls 502 and 504 and further controls the torque output from the slave motors 454a, 454b, 456a and 456b which are operatively connected to the downtilted rolls 450a, 450b, 452a and 452b of the first and second driven stub roll pairs 442 and 444. In particular, the device 446 controls the master motors 506 and 508 to operate at a prescribed angular velocity and then monitors the torques of the master motors 506 and 508 so that it can control the torques of the slave motors 454a, 454b, 456a and 456b to match a predetermined percentage of the average of the measured torque of the master motors 506 and 508. For instance, the device 446 can control the slave motors 454a, 454b, 456a and 456b to output torque that is 0-10% of the average of the monitored torques of the two master motors 506 and 508. This particular control scheme does have one drawback in that it may not prevent undesirable variations in a roll-wind-up force which can arise from small geometrical/size variations in the rolls 450a, 450b, 452a, 452b, 502a, 502b, 504a and 504b (note: this is not an issue when the pull roll apparatus 540 that implements the control scheme described above with respect to FIG. 5C). Lastly, it should also be appreciated that the pulling roll apparatus 540 may also include an optional pair of edge rolls 458 and 460 (see FIG. 5B).

In fact, there are many different control schemes that could be implemented by the pull roll apparatus 540. For instance, an additional control scheme is to operate the lower rolls 502 and 504 at a constant angular velocity and operate the upper stub roll pairs 442 and 444 at a constant angular velocity. For stable operation, the lower drive rolls 502 and 504 would be set to a slightly faster speed than the upper stub roll pairs 442 and 444. Although this would not be as preferred as the other schemes, and may result in more roll wear, constant velocity is easier to deploy and operate and may be adequate in certain applications. Another possible control scheme is to drive one lower roll 502 on one side with constant velocity and idle the other lower roll 502 on the opposing side of the ribbon. And, the upper stub roll pairs 442 and 444 in the same way can be velocity controlled and idled instead of torque controlled. The idling function could be accomplished by using an electromagnetic clutch. By idling some of the rolls, some of the advantages of the present invention can be realized and this scheme may be appropriate in certain applications.

The pull roll apparatus 540 has several advantages relative to the traditional pull roll apparatus 140. For instance, the first and second driven stub roll pairs 442 and 444 effectively enable: (1) the tuning of the cross-draw tension 448a to reduce stress and warp in the glass sheet 305; (2) the reduction and possible elimination of the roll wind-up forces; and (3) the reduction of changes in the cross-draw tension 448a during the cycling of the glass sheet 305. And, the pulling roll assembly 500 has several advantages including (for example): (1) the absorbing of the glass sheet's variable weight when the TAM 350 scores the glass sheet 305 and when the scored glass sheet 305 is separated into smaller glass sheets 355; (2) the colder pull rolls 502 and 504 cause less cycling in the cross-draw tension 448a while manufacturing the glass sheet 305; and (3) the lower position of the pull rolls 502 and 504 results in less impact on the glass sheet 305 while it is located in the setting zone which is where the two driven stub roll pairs 442 and 444 are located. Another advantage of the pulling roll assembly 500 is that it moves the variable pulling forces caused by the glass sheet cutoff which results in cross-draw force variability to the colder portion of the glass ribbon. This allows the first and second driven stub roll pairs 442 and 444 conditions to be more constant which is desirable since these components are typically located close to the visco-elastic glass temperatures where product stress and flatness can be affected. Further, the colder conditions associated with the pulling roll assembly 500 result in less shaft flex, which allows the variable load to translate to variable cross-draw tension. For best isolation, the pull roll apparatus 500 would be located as close to the TAM 350 as practical.

In addition, the pull roll apparatus 540 can be used to help recover from a "crackout" event which is what occurs when there is a break in the glass sheet 305 that runs from the TAM 350 up into the two driven stub roll pairs 442 and 444. In this situation, the control device 446 would sense a torque loss at the pull rolls 502 and 504 and then immediately switch the motors 454a, 454b, 456a and 456b to run at a constant angular velocity. Optionally, the lower pull rolls 502 and 504 may be automatically opened to facilitate the re-threading the glass sheet 305 through the lower rolls 502 and 504. And, once the glass sheet 305 is being properly drawn again then the control device 446 (or a manual means if desired) can be used to switch back to one of the aforementioned control schemes.

Figure 6A:
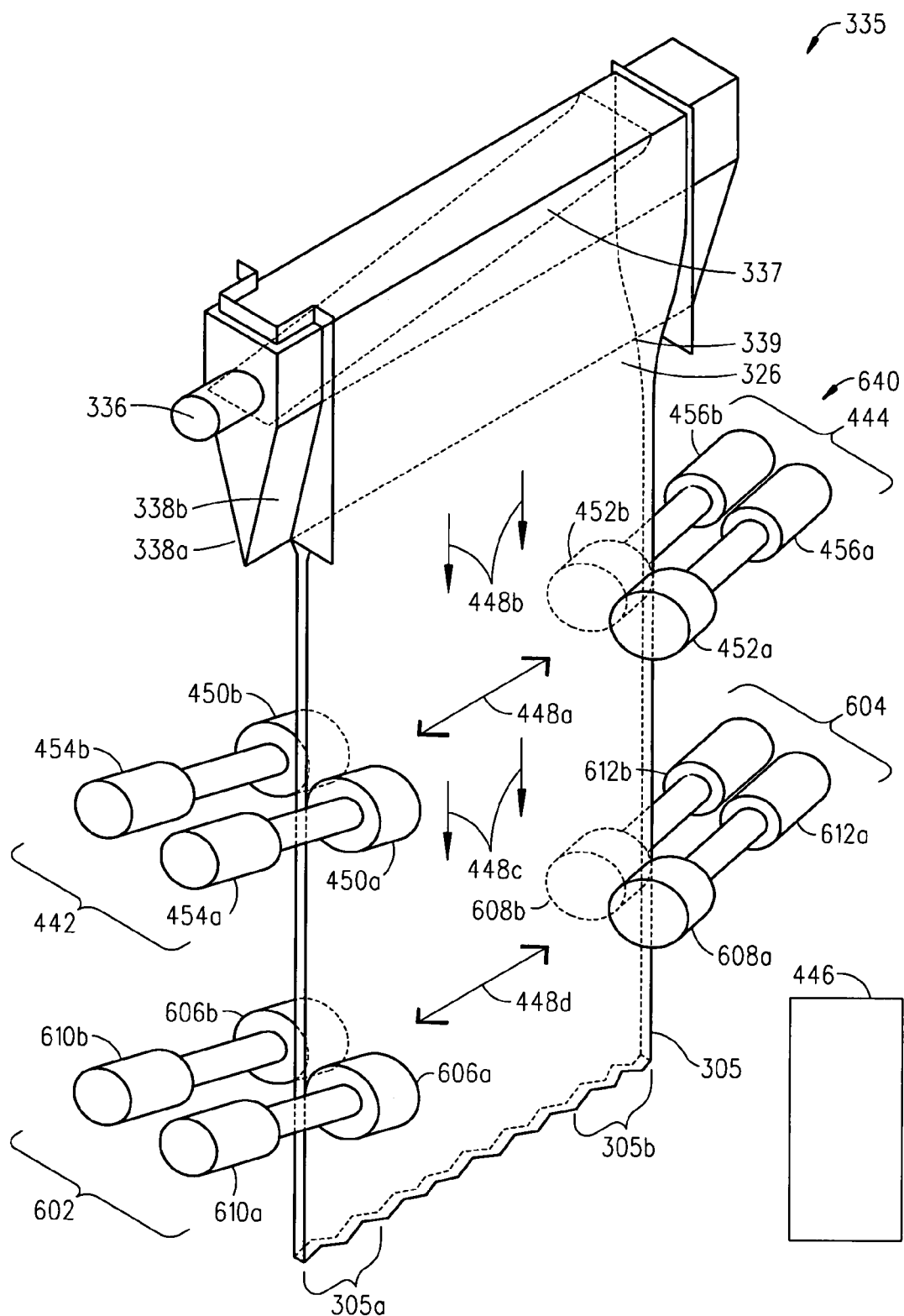
FIGS. 6A-6D are several diagrams illustrating a pull roll apparatus in accordance with a third embodiment of the present invention.

Referring to FIGS. 6A-6D, there are several diagrams associated with the pull roll apparatus 640 that is configured in accordance with a third embodiment of the present invention. As shown in FIG. 6A, the pull roll apparatus 640 includes third and fourth cantilevered driven stub roll pairs 602 and 604 in addition to the components associated with the first described pull roll apparatus 440 namely a first cantilevered driven stub roll pair 442, a second cantilevered driven stub roll pair 444 and a control device 446 (e.g., computer 446, programmable logic controller 446) (note: FIG. 6A is not to scale). In this embodiment, the third cantilevered driven stub roll pair 602 is located directly below the first cantilevered driven stub roll pair 442 and has two vertically downtilted rolls 606a and 606b between which there is drawn the first edge portion 305a of the glass sheet 305. Likewise, the fourth cantilevered driven stub roll pair 604 is located directly below the second cantilevered driven stub roll pair 444 and has two vertically downtilted rolls 608a and 608b between which there is drawn the opposing second edge portion 305b of the glass sheet 305. The device 446 operates the four cantilevered driven stub roll pairs 442, 442, 602 and 604 in a manner to control and improve the consistency of cross draw tensions 448a and 448d and down-draw sheet tensions 448b and 448c which reduces residual stress and improves glass flattening while the glass sheet 305 is being manufactured. The addition of the lower stub roll pairs 602 and 604 also give rise to the ability to control different sets of cross-draw tensions 448a and 448*d* and down-draw tensions 448*b* and 448*c* within the ribbon. For instance, the upper stub roll pairs 442 and 444 can control the cross-draw tension 448*a* and the down-draw tension 448*b* in the ribbon located between themselves and the isopipe 335, and the lower stub roll pairs 602 and 604 can control the cross-draw tension 448*d* and the down-draw tension 448*c* in the ribbon located between themselves and the upper stub roll pairs 442 and 444. The device 446 can implement anyone of a number of control schemes to effectively control the cross-draw tension variability 448*a* and 448*d* and down-draw tensions 448*b* and 448*c* in the glass sheet 305 by controlling the velocity, splay angle, downtilt angle and/or torque of the four driven stub roll pairs 442, 444, 602 and 604 (note: it may be desirable to splay or downtilt differently one or more of the rolls 450*a*, 450*b*, 452*a*, 452*b*, 606*a*, 606*b*, 608*a* and 608*b* depending on the processing conditions). Several exemplary control schemes are discussed in detail next with respect to FIGS. 6B-6C.

Figures 6B, 6C:
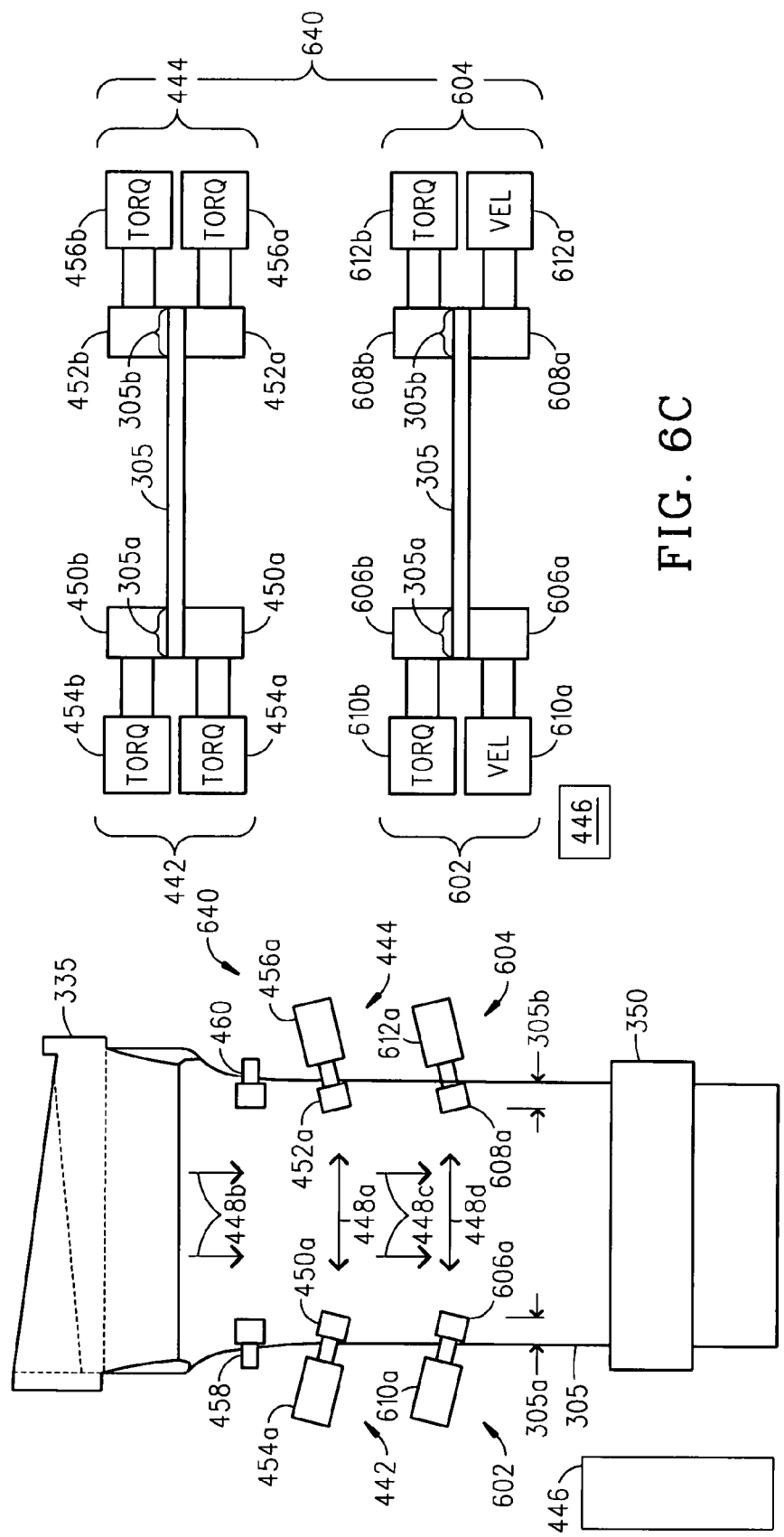
Figure 6D:
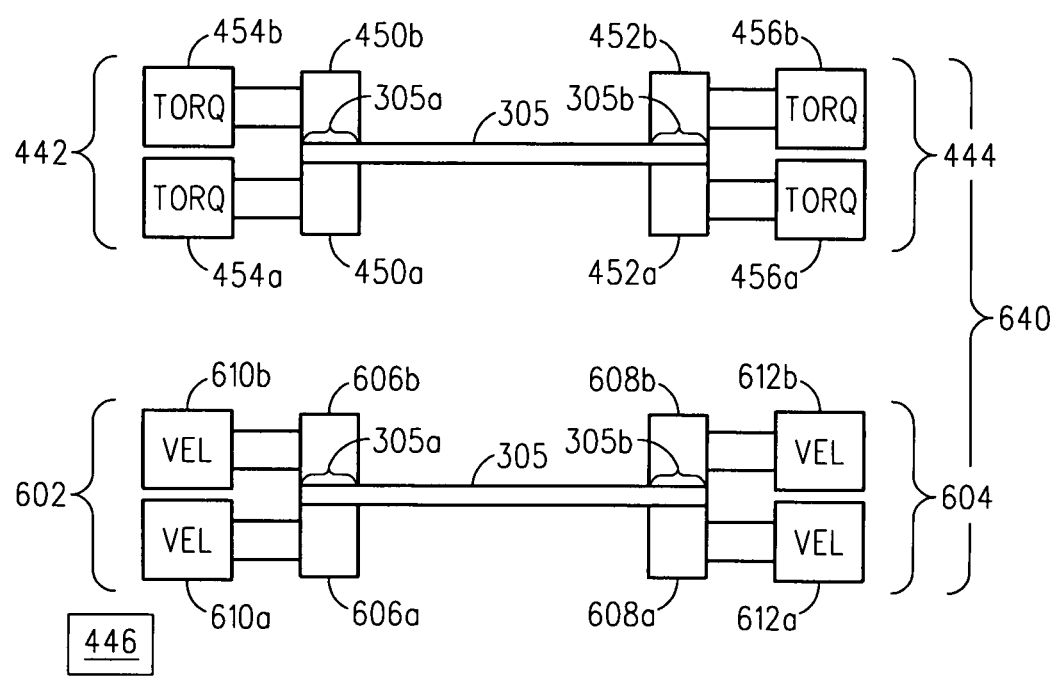

An exemplary control scheme that can be implemented by the pull roll apparatus 640 to effectively control/adjust the cross-draw tensions 448*a* and 448*d* and the down-draw tensions 448*b* and 448*c* within the glass sheet 305 is described next with the aid of FIGS. 6B-6C. In this case, the device 446 (e.g., programmable logic controller 446) controls the velocities (revolutions per minute) of master motors 610*a* and 612*a* which are operatively connected to downtilt rolls 606*a* and 608*a* and further controls torques of slave motors 610*b* and 612*b* which are operatively connected to downtilt rolls 606*b* and 608*b* and then controls the torque output from the slave motors 454*a*, 454*b*, 456*a* and 456*b* which are operatively connected to the downtilted rolls 450*a*, 450*b*, 452*a* and 452*b* of the first and second driven stub roll pairs 442 and 444. In particular, the device 446 controls the master motors 610*a* and 612*a* to operate at a prescribed angular velocity and then monitors the torque of the master motors 610*a* and 612*a* so that it can control the torques of the slave motors 610*b*, 612*b*, 454*a*, 454*b*, 456*a* and 456*b* to match a predetermined percentage of the measured torque of the master motors 610*a* and 612*a*. For instance, the device 446 can control the slave motors 610*b* and 612*b* to output torque that is 50-100% of the monitored torques of their respective master motors 610*a* and 612*a* and further control the slave motors 454*a* and 454*b* to output torque that is 0-10% of the monitored torque of the master motor 610*a* and control the slave motors 456*b* and 456*b* to output torque that is 0-10% of the monitored torque of the master motor 612*a*. If desired, the device 446 can have one master motor 610*a* operating at a different velocity then the other master motor 612*a* to take into account any process asymmetries.

Another exemplary control scheme that can be implemented by the pull roll apparatus 640 to effectively control/adjust the crow-draw tensions 448*a* and 448*d* and the down-draw tensions 448*b* and 448*c* within the glass sheet 305 is described next with the aid of FIGS. 6B and 6C. In this case, the device 446 (e.g., programmable logic controller 446) controls velocities (revolutions per minute) of master motors 610*a*, 610*b*, 612*a* and 612*b* which are operatively connected to downtilt rolls 606*a*, 606*b*, 608*a* and 608*b* and further controls the torque output from slave motors 454*a*, 454*b*, 456*a* and 456*b* which are operatively connected to the downtilted rolls 450*a*, 450*b*, 452*a* and 452*b* of the first and second driven stub roll pairs 442 and 444. In particular, the device 446 controls the master motors 610*a*, 610*b*, 612*a* and 612*b* to operate at a prescribed angular velocity and then monitors the torques of the master motors 610*a*, 610*b*, 612*a* and 612*b* so that it can control the torques of the slave motors 454*a*, 454*b*, 456*a* and 456*b* to match a predetermined percentage of the average of the measured torques of the master motors 610*a*, 610*b*, 612*a* and 612*b*. For instance, the device 446 can control the slave motors 454*a* and 454*b* to output torque that is 0-10% of the average of the two monitored torques of master motors 610*a* and 610*b* and then control the slave motors 456*a* and 456*b* to output torque that is 0-10% of the average of the two monitored torques of master motors 612*a* and 612*b*. If desired, the device 446 can have master motors 610*a* and 610*b* on one side operating at a different velocity then the master motors 612*a* and 612*b* located on another side to take into account any process asymmetries.

In fact, there are many different control schemes that could be implemented by the pull roll apparatus 640. For instance, an additional control scheme is to operate the lower stub roll pairs 602 and 604 at a constant angular velocity and operate the upper stub roll pairs 442 and 444 at a constant angular velocity. For stable operation, the lower stub roll pairs 602 and 604 would be set to a slightly faster speed than the upper stub roll pairs 442 and 444. Although this would not be as preferred as the other schemes, and may result in more roll wear, constant velocity is easier to deploy and operate and may be adequate in certain applications. Another possible control scheme is to drive one lower roll 606*a*/608*a* on one side with constant velocity and idle the other lower roll 606*b*/608*b* on the opposing side of the ribbon. And, the upper stub roll pairs 442 and 444 can in the same way be velocity controlled and idled instead of torque controlled. The idling function could be accomplished by using an electromagnetic clutch. By idling the rolls, some of the advantages of the present invention can be realized and this scheme may be appropriate in certain applications.

The pull roll apparatus 640 has several advantages relative to the traditional pull roll apparatus 140. For instance, the first and second driven stub roll pairs 442 and 444 effectively enable: (1) the tuning of the cross-draw tension 448*a* to reduce stress and warp in the glass sheet 305; (2) the reduction and possible elimination of the drive wind-up forces; and (3) the reduction of changes in the cross-draw tensions 448*a* and 448*d* during the cycling of the glass sheets 305. And, the third and fourth driven stub roll pairs 602 and 604 effectively enable (for example): (1) the absorbing of the glass sheet's variable weight when the TAM 350 scores the glass sheet 305 and when the scored glass sheet 305 is separated into smaller glass sheets 355; (2) the colder downtilt rolls 606*a*, 606*b*, 608*a* and 608*b* cause less cycling in the cross-draw tension 448*a* while manufacturing the glass sheet 305; and (3) the lower position of the downtilt rolls 606*a*, 606*b*, 608*a* and 608*b* results in less impact on the glass sheet 305 while it is located in the setting zone which is where the two driven stub roll pairs 442 and 444 are located. It should be noted that the third and fourth constant torque driven stub roll pairs 602 and 604 can have their downtilt angles and splay angles adjusted in the same manner as the first and second constant torque driven stub roll pairs 442 and 444.

In addition, the pull roll apparatus 640 can be used to help recover from a "crackout" event which is what occurs when there is a break in the glass sheet 305 that runs from the TAM 350 up into the two driven stub roll pairs 442 and 444. In this situation, the control device 446 would sense a torque loss at the lower driven stub roll pairs 602 and 604 and then immediately switch the motors 454*a*, 454*b*, 456*a* and 456*b* to run at a constant velocity. Optionally, the lower pull rolls 606*a*, 606*b*, 608*a* and 608*b* may be automatically opened to be facilitate the re-threading the glass sheet 305 through the lower rolls 606*a*, 606*b*, 608*a* and 608*b*. And, once the glass sheet 305 is being properly drawn again then the control device 446 (or manual means if desired) can switch back to one of the aforementioned control schemes. Lastly, it should also be noted that the pulling roll apparatus 640 may also include an optional pair of edge rolls 458 and 460 (see FIG. 6B).

Referring to FIGS. 7A-7B, there are several diagrams associated with the pull roll apparatus 740 that is configured in accordance with a fourth embodiment of the present invention. As shown, the pull roll apparatus 740 includes a first cantilevered driven stub roll pair 442, a second cantilevered driven stub roll pair 444 and a control device 446 (e.g., computer 446, programmable logic controller 446) (note: FIG. 4A is not to scale). The device 446 effectively controls a down-draw tension 448b in the glass sheet 305 by controlling the two driven stub roll pairs 442 and 444 while a first edge portion 305a of the glass sheet 305 is drawn between two horizontal rolls 450a and 450b which are associated with the first driven stub roll pair 442 and while an opposing second edge portion 305b of the glass sheet 305 is drawn between two horizontal rolls 452a and 452b which are associated with the second driven stub roll pair 444 (see FIG. 7B). If desired, the horizontal rolls 450a, 450b, 452a and 452b can also be positioned (either automatically or manually) to have a predetermined positive splay angle θ which controls the amount of cross-draw force 448a which is generated across the glass sheet 305. Plus, the pull roll apparatus 740 may also incorporate the pulling roll assembly 500 (see FIG. 5A) or the third and fourth cantilevered driven stub roll pairs 602 and 604 (see FIG. 6A). Moreover, the pull roll apparatus 740 may implement anyone of the control schemes discussed above with respect to pull roll apparatuses 440, 540 and 640. It should be appreciated that the pulling roll apparatus 740 may also include optional pair(s) of edge rolls 458 and 460 and/or optional pair(s) of idle stub rolls 462 and 464 (see FIG. 7B) (note: if desired the idle stub rolls 462 and 464 can be horizontal and not downtilted as shown).

As can be seen, the pull roll apparatus 740 indicates that it is not required to have downtilted rolls 450a, 450b, 452a and 452b but that the horizontal rolls 450a, 450b, 452a and 452b can result in an advantageous drive layout. For instance, if an exemplary fusion process results in ribbon glass that is under high internal tension due to thermal gradients within the ribbon glass. Then, extra cross tension from the vertically downtilted rolls 450a, 450b, 452a and 452b may not be all that helpful to performance but the other benefits from the low motion drive control schemes described herein and the horizontal rolls 450a, 450b, 452a and 452b could have a big impact on the performance.

From the foregoing it can be seen that the pull roll assemblies 440, 540, 640 and 740 of the present invention have the capability to manage, adjust and control both cross-draw tension 448a and down-draw tension 448b forces while manufacturing a glass sheet 305. This is accomplished by the use of multiple stub rolls and/or powered pull rolls where external forces such as a robot's interaction at sheet "snap-off" and the resulting changes in total weight of the glass sheet 305 on the drawing process are controlled. Moreover, the pull roll assemblies 440, 540, 640 and 740 can minimize or eliminate roll induced forces such as roll "wind-up" which is caused by differences in angular velocity due to roll diameter differences, shaft warp, uneven machining or wear etc. . . . Following are some additional features, uses and capabilities of the pull roll apparatus 440, 540, 640 and 740 of the present invention:

1. A technical benefit of the new drive scheme is to provide adjustment and control of the cross-draw tension 448a and the down-draw tension 448b. This is important since this type of control helps lower residual stress and improve sheet flatness in the resulting glass sheets 355.

2. Changes in the draw tension balance below the fusion pipe 335 is now possible due to the use of torque and/or velocity control of four pulling flats/rolls 450a, 450b, 452a and 452b at a position where effective process changes and monitoring can be achieved because the glass sheet 305 is in a visco-elastic phase.

3. Individual control of the four main pulling flats/rolls 450a, 450b, 452a and 452b is beneficial for matching the velocity and reducing the associated wind-up which causes surface damage. In the past, this wind-up was difficult to address since it is very difficult if not impossible to machine the compressible refractory roll covering of all four pulling flats/rolls on the two separate full length rolls in the traditional pull roll apparatus 140 to exactly the same, prescription, and diameter with no run-out. As a result, the traditional pull roll apparatus 140 suffered from differences in surface velocity which produced differential wear, glass surface damage and contamination.

4. The stub rolls 450a, 450b, 452a and 454b are inherently easier to machine to exacting tolerances than the prior art pulling rolls 142a, 142b, 144a and 144b due to their reduced physical size regardless of the size of the glass sheet 305.

5. By using the stub drive roll pairs 442 and 444, all glass manufacturing systems 300 can use the same rolls 450a, 450b, 452a and 452b. This was not possible in the past since each size platform and in some cases particular draws had rolls that where specifically designed for that particular process. As a result, the use of universal stub roll pairs 442 and 444 would reduce roll inventory significantly and reduce total roll costs. Plus, with the stub drive roll pairs 442 and 444, the nip location can be altered with a simple mechanical setup change. In contrast, with the traditional full length pull rolls 142 and 144, the pulling flats had to be remanufactured if the pulling flat location needed to be changed.

6. By use of splay control, the nip footprint can match the bead thickness gradient correctly. This results in lower roll wear, longer roll life, and less down time (and process upsets) than when using the traditional full length pull rolls 142 and 144.

7. The pull roll assemblies 440, 540, 640 and 740 also have the following advantageous features:

a. Minimize force cycling from flat to flat wind-up interactions (by elimination of the continuous shaft).

b. Manipulation of the cross-draw tension at the setting zone area of the glass sheet by tilting in a downward direction the stub roll axle to optimize product stress and flatness.

c. Measure the cross-draw tension and using this, in conjunction, with the downtilt capability to setup the optimal tension conditions to manufacture glass sheets with low stress and improved flatness.

d. Adjust downtilt angles to hold constant the desired tension over time to help compensate for roll wear, glass thickness gradient changes, and other normal variation sources (note: this can be done with either a manual or automated system).

e. Improve the consistency of the glass manufacturing process to assure optimal ribbon conditions necessary for maintaining low stress and flatness in the resulting glass sheet.

f. Control the stub roll motors using a master/slave differential control system algorithm (Master=constant torque/slave roll matches the master torque level) to eliminate roll to roll load imbalance, provide a more consistent pulling force, and improve product stress and flatness.

g. Use tension instruments and downtilts (inlet and compression balance, for example) so the driven stub rolls can offset force imbalances from normal process differences/variations and create more optimal ribbon conditions, and improve product stress and flatness. This may also improve thickness control and minimize bead mass (waste glass).

h. Adjust the splay angle of the stub roll mechanism (changing the horizontal angle between the stub rolls axles) which would allow for further manipulation of the cross-draw tension that is generated by the stub rolls. This capability could be leveraged like the downtilt angle.

i. The ability to adjust the flat/roll location of the stub roll mechanism which changes where the flat runs on the thickness gradient of the glass sheet which changes the horizontal contact angle at the roll flat and which in turn changes the cross-draw tension. This capability could be leveraged like the downtilt angle.

j. Use of a second roll (buffering roll) located well below the setting zone. This could be a continuous shaft roll or driven stub roll pairs (see FIGS. 5A-6A). This buffering roll would absorb the varying load of the ribbon from sheet removal and robot interaction and help minimize the disturbance in the visco-elastic area of the glass sheet 305.

k. Enable further manipulation of the ribbon tension levels at the setting zone, which may be helpful to lower stress and improve flatness.

l. The driven and buffering roll configuration also enables use of idle stub rolls between the driven and buffering rolls which can have a very high downtilt (high tensioning) position. The addition of these idle stub rolls would be expected to reduce ribbon motion and reduce product stress.

Although multiple embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

The invention claimed is:

1. A method for manufacturing a glass sheet, said method comprising the steps of:
   a) melting batch materials and forming the glass sheet;
   b) delivering the glass sheet to a pull roll apparatus;
   c) drawing the glass sheet and creating a cross-tension in the glass sheet using the pull roll apparatus which comprises:
      (i) a cantilevered vertically downtilted first stub roll pair for drawing a first edge portion of the glass sheet out away from a center of the glass sheet;
      (ii) a cantilevered vertically downtilted second stub roll pair for, at a location transversely opposite the first stub roll pair, drawing a second edge portion of the glass sheet out away from the center of the glass sheet, thereby creating a cross-tension in the glass sheet between the first stub roll pair and the second stub roll pair;
      (iii) a pull roll pair disposed below the first and second stub roll pairs for drawing the first edge portion and the opposing second edge portion of the glass sheet and creating a vertical draw tension on the glass sheet between the pull roll pair and the first and second stub roll pairs;
   d) monitoring the torque of at least one of the pull rolls in the pull roll pair;
   e) monitoring the torque of at least one of the stub rolls in the first stub roll pair and at least one of the stub rolls in the second stub roll pair;
   f) controlling the torque of at least one of the pull rolls in the pull roll pair; and
   g) controlling the torque of at least one of the stub rolls in the first stub roll pair and the torque of at least one of the stub rolls in the second stub roll pair to be a predetermined percentage of the torque of the at least one pull roll.

2. The method of claim 1, further comprising the step of controlling and adjusting a downtilt position of said first stub roll pair and said second stub roll pair.

3. The method of claim 1, wherein said drawing step further comprising a step of positioning each of the stub rolls to have a desired splay angle which is a horizontal angle that a corresponding roll face is positioned relative to a major surface of the glass sheet.

4. The method of claim 1, wherein said controlling the torque of at least one of the stub rolls in the first stub roll pair and in at least one of the stub rolls in the second stub roll pair step further comprising controlling and adjusting angular velocities of at least one of the stub rolls in each of the first and second stub roll pairs while idling the other one of the stub rolls in each of the first and second stub roll pairs.

5. The method of claim 1, wherein said controlling the torque of at least one of the pull rolls step further comprising controlling and adjusting an angular velocity of motors operatively connected to the stub rolls of said first and second stub roll pairs.

6. The method of claim 1, wherein the step of controlling the torque of the stub rolls comprises controlling the torque of the at least one of the stub rolls in the first stub roll pair and the torque of the at least one of the stub rolls in the second stub roll pair to be 50% to 100% of the torque of the at least one pull roll.

7. A method for manufacturing a glass sheet, said method comprising the steps of:
   a) melting batch materials and forming the glass sheet;
   b) delivering the glass sheet to a pull roll apparatus;
   c) drawing the glass sheet and creating a cross-tension in the glass sheet using the pull roll apparatus which comprises:
      (i) a cantilevered vertically downtilted first stub roll pair for drawing a first edge portion of the glass sheet out away from a center of the glass sheet;
      (ii) a cantilevered vertically downtilted second stub roll pair for, at a location transversely opposite the first stub roll pair, drawing a second edge portion of the glass sheet out away from the center of the glass sheet, thereby creating a cross-tension in the glass sheet between the first stub roll pair and the second stub roll pair;
      (iii) a cantilevered vertically downtilted third stub roll pair disposed below said first stub roll pair, for drawing the first edge portion of the glass sheet out away from the center of the glass sheet;
      (iv) a cantilevered vertically downtilted fourth stub roll pair, disposed below said second stub roll pair at a location transversely opposite the third stub roll pair, for drawing the second edge portion of the glass sheet out away from the center of the glass sheet, thereby creating a cross-tension in the glass sheet between the third stub roll pair and the fourth stub roll pair;
   d) monitoring the torque of at least one of the stub rolls in the first stub roll pair and at least one of the stub rolls in the second stub roll pair;
   e) monitoring the torque at least one of the stub rolls in the third stub roll pair and at least one of the stub rolls in the fourth stub roll pair;

f) controlling the torque of at least one of the stub rolls in the third stub roll pair and at least one of the stub rolls in the fourth stub roll pair; and g) controlling the torque of the at least one of the stub rolls in the first stub roll pair and at least one in the stub rolls of second stub roll pair to be a predetermined percentage of the torque of at least one of the stub rolls in the third stub roll pair and at least one of the stub rolls in the fourth stub roll pair.

8. The method of claim 7, wherein the step of controlling step the torques of the stub rolls further comprising the steps of controlling and adjusting angular velocities of master motors operatively connected to at least one of the stub rolls in the third stub roll pair and at least one of the stub rolls in the fourth stub roll and also controlling and adjusting torques of slave motors operatively connected to at least one of the stub rolls in the first stub roll pair and at least one in the stub rolls of second stub roll pair.

9. The method of claim 7, wherein the step of controlling the torque the at least one of the stub rolls in the first stub roll pair and at least one of the stub rolls in the second stub roll pair comprises controlling the torque of at least one of the stub rolls in the first stub roll pair and the torque of at least one in the stub rolls to be 0% to 10% of the torque of the at least one of the stub rolls of third stub roll pair and at least one of the stub rolls of fourth stub roll.

10. The method of claim 7, further comprising the step of controlling and adjusting a downtilt position of said first stub roll pair and said second stub roll pair.

11. The method of claim 10, further comprising the step of controlling and adjusting a downtilt position of said third stub roll pair and said fourth stub roll pair.

12. The method of claim 7, wherein said drawing step further comprising positioning each of the stub rolls to have a desired splay angle which is a horizontal angle that a corresponding roll face is positioned relative to a major surface of the glass sheet.

13. The method of claim 7, wherein the controlling the torque of the at least one of the stub rolls in the first stub roll pair and in the second stub roll pair step further comprising controlling and adjusting angular velocities of the at least one of the stub rolls in each of said first and second stub roll pairs while idling the other one of the stub rolls in each of said first and second stub roll pairs.

14. The method of claim 7, wherein the controlling the torque of the at least one of the stub rolls in the third stub roll pair and at least one of the stub rolls in the fourth stub roll pair step further comprising controlling and adjusting an angular velocity of motors operatively connected to the at least one of the stub rolls in the third stub roll pair and at least one of the stub rolls in the fourth stub roll pair.

* * * * *